(12) United States Patent
Choi et al.

(10) Patent No.: US 10,106,116 B2
(45) Date of Patent: Oct. 23, 2018

(54) ACCELERATION SENSOR AND SEAT BELT RETRACTOR

(71) Applicant: ASHIMORI INDUSTRY CO., LTD., Osaka-shi, Osaka (JP)

(72) Inventors: Insu Choi, Wonju-si (KR); Satoshi Suminaka, Settsu (JP); Kenichi Shigesato, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 302 days.

(21) Appl. No.: 15/198,325

(22) Filed: Jun. 30, 2016

(65) Prior Publication Data
US 2017/0015274 A1    Jan. 19, 2017

(30) Foreign Application Priority Data

Jul. 16, 2015 (JP) ................................ 2015-142077

(51) Int. Cl.
*B60R 22/40* (2006.01)
*B60R 21/0132* (2006.01)

(52) U.S. Cl.
CPC .......... *B60R 21/0132* (2013.01); *B60R 22/40* (2013.01)

(58) Field of Classification Search
CPC ............................ B60R 22/40; B60R 21/0132
See application file for complete search history.

(56) References Cited

U.S. PATENT DOCUMENTS

| 4,467,981 A * | 8/1984 | Mori | ...................... B60R 22/405 |
| | | | 242/383.5 |
| 4,844,374 A | 7/1989 | Mori | |
| 6,443,382 B1 * | 9/2002 | Bae | ........................ B60R 22/405 |
| | | | 242/382.6 |
| 9,771,051 B2 * | 9/2017 | Egawa | .................... B60R 22/40 |

FOREIGN PATENT DOCUMENTS

JP            63-114867 U        7/1988

* cited by examiner

*Primary Examiner* — Sang K Kim
(74) *Attorney, Agent, or Firm* — Sughrue Mion, PLLC

(57) ABSTRACT

There is provided an acceleration sensor enabling precise positioning of a sensor lever of the acceleration sensor, for ensuring a stable operation of the acceleration sensor, and a seat belt retractor including the acceleration sensor. Shafts of a sensor lever projects from a base. The sensor lever is supported between supports of a sensor holder so as to be rotatable and shiftable in a rotation axis direction. The sensor lever is rotated by displacement of an inertia mass. A limiting portion of the sensor holder is brought into contact with contact portions of the sensor lever. The limiting portion limits shifting of the sensor lever in the rotation axis direction, so as to avoid contact between the base and the supports.

16 Claims, 23 Drawing Sheets

ACCELERATION SENSOR AND SEAT BELT RETRACTOR

BACKGROUND OF THE INVENTION (1) Field of the Invention

The present invention relates to an acceleration sensor that detects acceleration with an inertia mass, for a seat belt retractor, and a seat belt retractor including the acceleration sensor.

(2) Description of Related Art

A vehicle such as an automobile is equipped with a seat belt device including a retractor, for protecting an occupant sitting in a seat. The occupant pulls out a webbing (a seat belt) from the retractor and wears the webbing. When an acceleration sensor of the retractor detects an acceleration of a predetermined value or greater caused by collision of the vehicle or the like, the acceleration sensor activates a locking mechanism of the retractor. The locking mechanism stops the webbing from being pulled out, and the webbing restrains the occupant on the seat. Further, the acceleration sensor also detects acceleration caused by tilting of the vehicle, and activates the locking mechanism. That is, the acceleration sensor detects also tilting of the vehicle in a rollover accident, and activates the locking mechanism.

In general, an acceleration sensor includes an inertia mass that is displaced by an inertia force due to acceleration, and detects acceleration with the inertia mass. Further, a conventionally known acceleration sensor includes a ball being an inertia mass, and a pole (a sensor lever) rotatably supported by a pair of arms (supports) of a bracket (a sensor holder) (see Japanese Utility Model Application Publication No. 63-114867).

In the conventional acceleration sensor disclosed in Japanese Utility Model Application Publication No. 63-114867, the ball is displaced by an inertia force, causing the sensor lever to rotate to be displaced. The displaced sensor lever of the acceleration sensor activated in this manner activates the locking mechanism of the retractor.

When the conventional acceleration sensor is assembled, the interval between the pair of supports is widened, and a pin (a shaft) of the sensor lever is inserted into support holes of the pair of supports. At this time, the pair of supports must elastically deform. Further, taking into account of ease in mounting the sensor lever or movability of the mounted sensor lever, a certain clearance in the rotation axis direction must be provided between the sensor lever and the pair of supports. Still further, the components are different from each other in dimension, and there is play between the components. These conditions make it difficult to restrict shifting of the sensor lever in the rotation axis direction, and may result in deviation of the sensor lever from the intended position.

In particular, when the vehicle tilts, the sensor lever tends to shift in the rotation axis direction because its rotation axis tilts relative to the horizontal direction. Inappropriate positioning of the sensor lever may disadvantageously influence the stable operation of the acceleration sensor. Accordingly, there is a need to design the locking mechanism taking into account of positional deviation of the sensor lever, which hinders a reduction in size of the locking mechanism.

SUMMARY OF THE INVENTION

The present invention has been made in light of the conventional problem described above, and an object thereof is to provide an acceleration sensor enabling precise positioning of a sensor lever of the acceleration sensor, for ensuring a stable operation of the acceleration sensor, and to provide a seat belt retractor including the acceleration sensor.

The present invention provides an acceleration sensor for a seat belt retractor, including: a sensor holder having a pair of supports; an inertia mass placed on the sensor holder and displaced by an inertia force; and a sensor lever having a base disposed between the pair of supports, and a pair of shafts projecting from the base and supported by the pair of supports. The sensor lever is supported between the pair of supports so as to be rotatable about a rotation axis and shiftable in a rotation axis direction. The sensor lever is disposed above the inertia mass and rotated and displaced by displacement of the inertia mass. The sensor holder has a limiting portion coming into contact with the sensor lever so as to limit shifting of the sensor lever in a first direction and a second direction in the rotation axis direction. The sensor lever has a pair of contact portions coming into contact with the limiting portion when the sensor lever shifts in the first direction and the second direction, respectively. The limiting portion limits the shifting of the sensor lever in any of the first direction and the second direction so as to avoid contact between the base and the pair of supports.

The present invention also provides a seat belt retractor including the acceleration sensor.

The present invention provides an acceleration sensor enabling precise positioning of a sensor lever of the acceleration sensor, for ensuring a stable operation of the acceleration sensor, and also provides a seat belt retractor including the acceleration sensor.

DETAILED DESCRIPTION OF PREFERRED EMBODIMENTS

With reference to the drawings, a description will be given of a seat belt retractor (hereinafter referred to as a retractor) according to an embodiment of the present invention.

The retractor according to the present embodiment is a webbing wind-up device that winds up a webbing of a seat belt, and is provided to a vehicular seat belt device. The seat belt device including the retractor is installed in a vehicle, and protects an occupant sitting in a seat with the webbing (the seat belt).

Figures 1A, 1B:
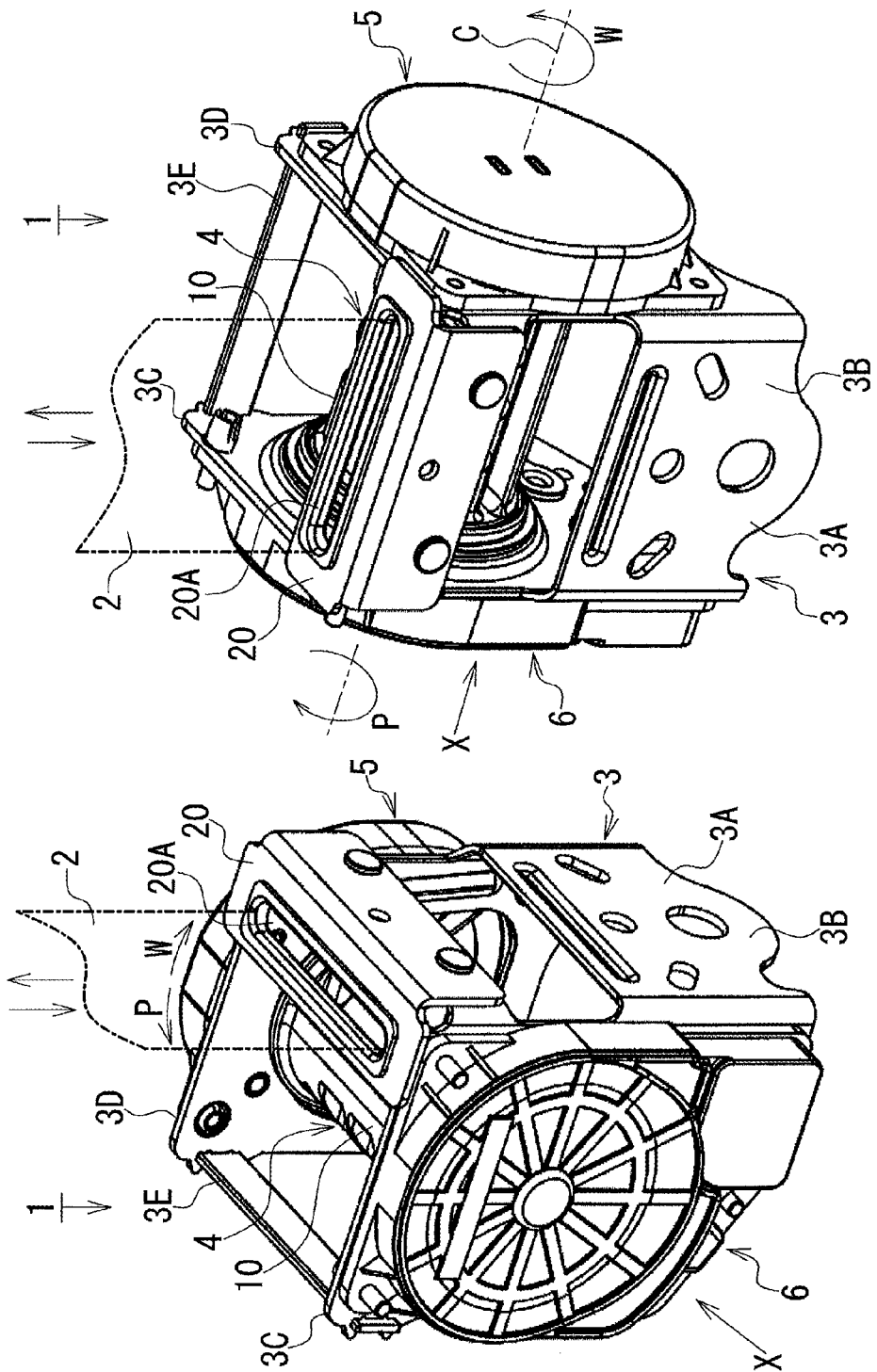
FIGS. 1A and 1B are each a perspective view of a retractor according to an embodiment.
Figure 2:
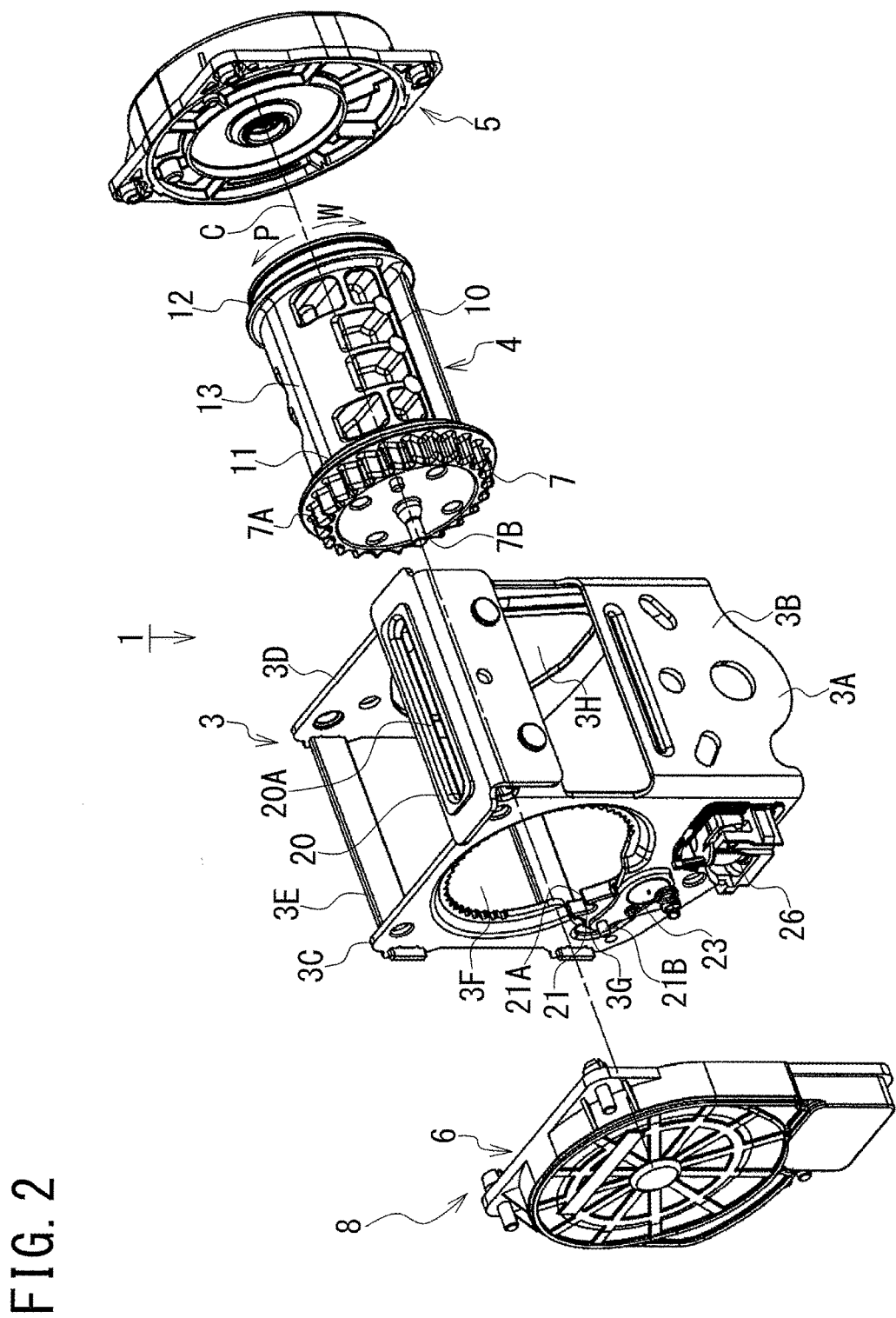
FIGS. 2 and 3 are each an exploded perspective view of the retractor in a plurality of units.
Figure 3:
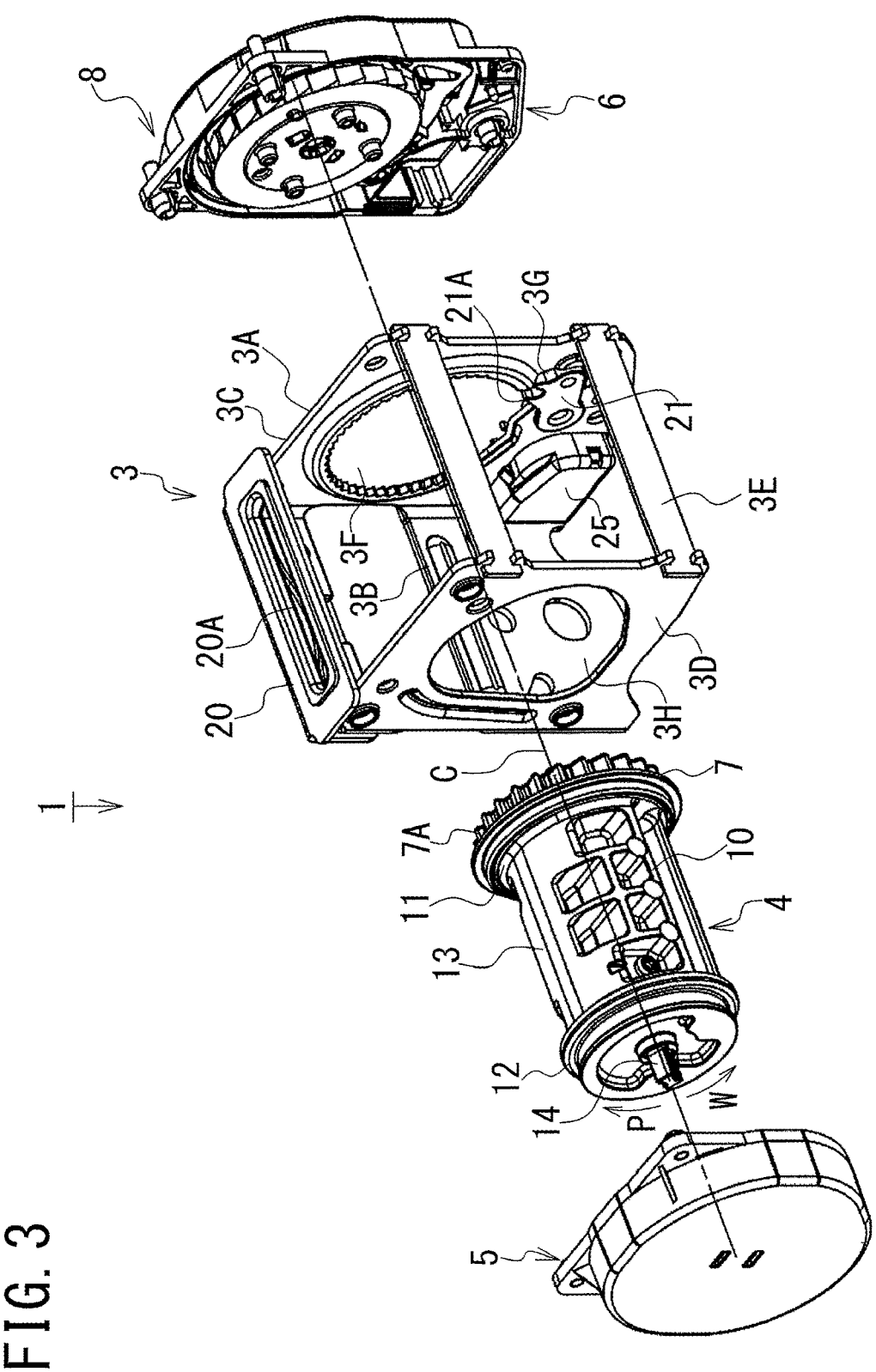

FIGS. 1A and 1B are each a perspective view of a retractor 1 according to the present embodiment, in which a band-like webbing 2 is represented by a broken line. FIGS. 1A and 1B show the entire retractor 1 as seen from different directions. FIGS. 2 and 3 are each an exploded perspective view of the retractor 1 in a plurality of units, and show the retractor 1 as seen from different directions.

As shown in the drawings, the retractor 1 includes a housing unit 3, a spool unit 4, a winding spring unit 5, and a locking unit 6.

The spool unit 4 includes a spool 10 that rotates about a center line C, and a ratchet gear 7. The spool 10 includes a pair of ends 11 and 12 (a first end 11, a second end 12), a webbing wind-up portion 13 positioned between the first end 11 and the second end 12, and a spool shaft 14 formed at the center of the second end 12. The webbing 2 is attached to the webbing wind-up portion 13 and wound up around the webbing wind-up portion 13 of the spool 10. The ratchet gear 7 has a plurality of teeth (ratchet teeth) 7A. The ratchet gear 7 is disposed at the first end 11 of the spool 10, and rotates and stops together with the spool 10.

In the state where the spool 10 is disposed in the housing unit 3, the winding spring unit 5 and the locking unit 6 are fixed to the side surfaces of the housing unit 3, to rotatably support the spool unit 4. Mounting the housing unit 3 on a vehicle allows the retractor 1 to be installed in the vehicle.

The winding spring unit 5 and the locking unit 6 support the spool unit 4 and the spool 10 so as to be rotatable in a retracting direction W and an extracting direction P of the webbing 2. The retracting direction W is the rotation direction of the spool 10 for winding up the webbing 2, and the extracting direction P is the rotation direction of the spool 10 for allowing the webbing 2 to be pulled out. As the webbing 2 is wound up or pulled out, the spool 10 rotates in the retracting direction W or the extracting direction P of the webbing 2.

The winding spring unit 5 is a biasing mechanism that biases the spool 10 (the spool unit 4) in the retracting direction W of the webbing 2, and serves as means for winding up the webbing 2 around the spool 10. The winding spring unit 5 is coupled to the spool shaft 14 of the spool 10. The spool 10 is constantly biased in the retracting direction W by the winding spring unit 5, and rotates in the retracting direction W. The webbing 2 is wound up by the rotating spool 10 and is stored in the retractor 1. From this state, the webbing 2 is pulled out from the retractor 1 while rotating the spool 10 in the extracting direction P.

The locking unit 6 is positioned adjacent to the ratchet gear 7 of the spool unit 4, and structures a locking mechanism 8 with the ratchet gear 7. The locking mechanism 8 actuates in emergency of the vehicle to prevent the spool 10 from rotating in the extracting direction P of the webbing 2. Here, in accordance with (or in response to) a sudden change in the speed of the vehicle or sudden pull-out of the webbing 2, the locking mechanism 8 operates to lock the spool 10 rotating in the extracting direction P of the webbing 2. Further, the locking mechanism 8 has an acceleration detection mechanism. Using the acceleration detection mechanism, the locking mechanism 8 detects acceleration of the vehicle in emergency or sudden pull-out of the webbing 2 and operates. The locking mechanism 8 prevents the spool 10 from rotating in the extracting direction P, and accordingly pull-out of the webbing 2 stops. At this time, the locking mechanism 8 prevents the ratchet gear 7 from rotating, and accordingly the spool unit 4 and the spool 10 stop rotating.

Next, each of the units of the retractor 1 will be described in more detail. Winding Spring Unit 5

Figure 4:
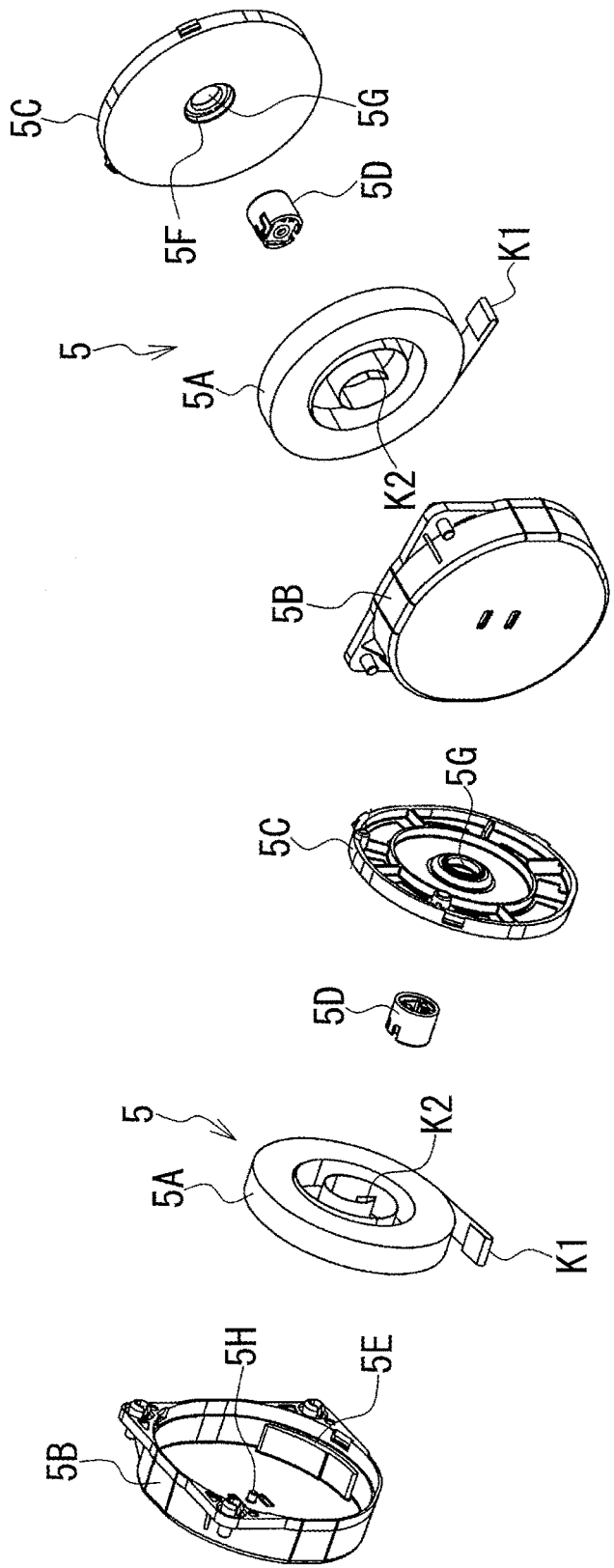
FIGS. 4A and 4B are each an exploded perspective view of a winding spring unit.

FIGS. 4A and 4B are each an exploded perspective view of the winding spring unit 5, showing the winding spring unit 5 as seen from different directions.

As shown in the drawings, the winding spring unit 5 includes a spiral spring 5A, a spring case 5B, a spring cover 5C, and a cylindrical spring shaft 5D. An outer end K1 of the spiral spring 5A is fixed to a fixing portion 5E of the spring case 5B, and an inner end K2 of the spiral spring 5A is fixed to the spring shaft 5D. The spring case 5B houses the spiral spring 5A and the spring shaft 5D.

The spring cover 5C is mounted on the spring case 5B to cover the spiral spring 5A and the spring shaft 5D in the spring case 5B. Further, the spring cover 5C has a circular recess 5F formed at its center, and a bearing hole 5G formed at the center of the recess 5F. One end of the spring shaft 5D is disposed in the recess 5F of the spring cover 5C and is rotatably supported by the spring cover 5C. The other end of the spring shaft 5D is rotatably supported by a pin 5H of the spring case 5B. The spool shaft 14 of the spool 10 is inserted into the bearing hole 5G and is fixed to the spring shaft 5D. The spring cover 5C rotatably supports the spool shaft 14.

The spring shaft 5D integrally rotates with the spool 10, and transfers the biasing force of the spiral spring 5A to the spool 10. With the spiral spring 5A, the winding spring unit 5 constantly biases the spool 10 in the retracting direction W of the webbing 2. When the webbing 2 is pulled out, the spiral spring 5A is wound by the rotation of the spool 10. When the webbing 2 is wound up, the spool 10 rotates in the retracting direction W under the biasing force of the spiral spring 5A, to wind up the webbing 2.

Housing Unit 3

Figure 5:
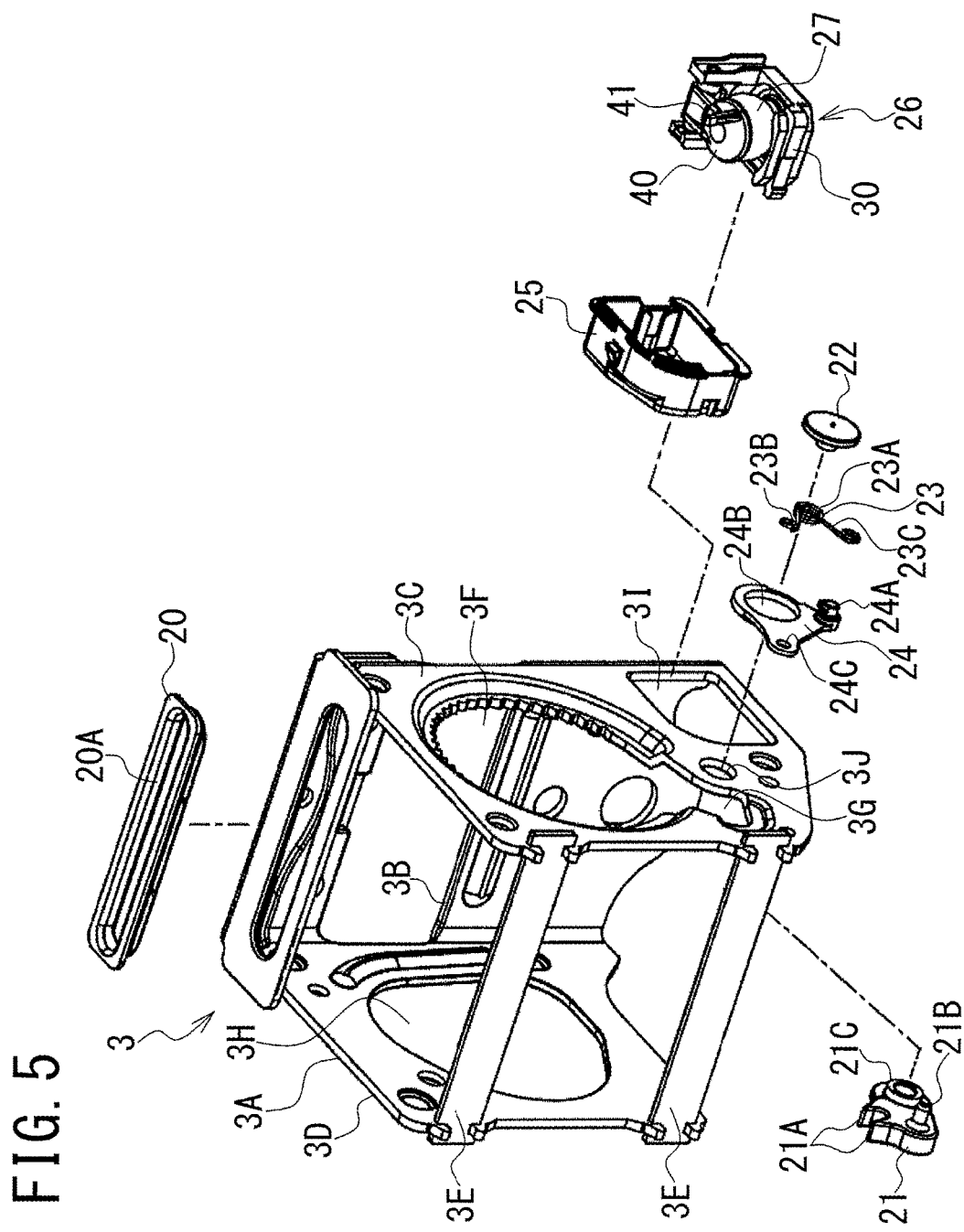
FIG. 5 is an exploded perspective view of a housing unit.

FIG. 5 is an exploded perspective view of the housing unit 3.

As shown in the drawing, the housing unit 3 includes a housing 3A that houses the spool 10, a protector 20, a pawl 21, a rivet 22, a return spring 23, a return plate 24, a sensor cover 25, and an acceleration sensor 26.

Housing 3A

The housing 3A includes a back wall 3B fixed to the vehicle body, a pair of side walls 3C and 3D (a first side wall 3C, a second side wall 3D), and two fixing plates 3E fixed to the pair of side walls 3C and 3D. The protector 20 has a slot 20A through which the webbing 2 passes, and is mounted on the back wall 3B. The first side wall 3C and the second side wall 3D project from the opposite side ends of the back wall 3B and oppose to each other. Further, the housing 3A has an opening (a first opening 3F) formed at the first side wall 3C, a pawl storage portion 3G connecting to the first opening 3F, and an opening (a second opening 3H) formed at the second side wall 3D.

The housing 3A houses the spool 10 between the first side wall 3C and the second side wall 3D so as to be rotatable in the retracting direction W and the extracting direction P of the webbing 2 (see FIGS. 2 and 3). In such a state, the locking unit 6 is mounted on the first side wall 3C, and the winding spring unit 5 is mounted on the second side wall 3D. Further, the ratchet gear 7 is disposed in the first opening 3F of the housing 3A, and the second end 12 of the spool 10 is disposed in the second opening 3H of the housing 3A.

Acceleration Sensor 26

The acceleration sensor 26 is an acceleration detection mechanism (a first acceleration detection mechanism) that detects acceleration, and includes an inertia mass 27, a sensor holder 30, and a sensor lever 40. Further, the acceleration sensor 26 is an emergency lock-activating device. In emergency of the vehicle, the acceleration sensor 26 detects acceleration of the vehicle with the inertia mass 27, and activates the locking mechanism 8. The inertia mass 27 is a metal sphere and is placed on the sensor holder 30. In this state, the inertia mass 27 is held so as to be displaceable between the sensor holder 30 and the sensor lever 40. The sensor lever 40 is disposed above the inertia mass 27 to cover the inertia mass 27 from above, and is mounted on the sensor holder 30 so as to be vertically displaceable.

The acceleration sensor 26 is inserted into the sensor cover 25, and the sensor holder 30 is mounted on the sensor cover 25. The sensor cover 25 is inserted into a mounting hole 31 of the first side wall 3C, and is mounted on the first side wall 3C. In this state, a projection 41 of the sensor lever 40 upwardly projects to position outside the sensor cover 25. When an acceleration of the vehicle reaches or exceeds a predetermined value due to an emergency situation of the vehicle (for example, collision, sudden braking), the inertia mass 27 is displaced on the sensor holder 30 by an inertia force, and pushes the sensor lever 40 upward. That is, the acceleration sensor 26 detects the acceleration of the vehicle from the displacement of the inertia mass 27, and lets the projection 41 of the sensor lever 40 be upwardly displaced by the inertia mass 27.

Pawl 21

The pawl 21 includes claws 21A that engage with the ratchet teeth 7A of the ratchet gear 7, a guide pin 21B, and a cylindrical boss 21C. The guide pin 21B is formed on one end side of the pawl 21 near the claws 21A, and projects outside the first side wall 3C. The boss 21C is formed on the other end side of the pawl 21 distanced from the claws 21A, and is inserted into a mounting hole 3J of the first side wall 3C from inside the housing 3A. The rivet 22 is inserted into the inner circumference of the boss 21C. Thus, the pawl 21 is rotatably mounted on the first side wall 3C.

Return Spring 23

The return spring 23 is a torsion spring formed into a V-shape, and includes a connecting spring portion 23A, a first arm 23B, and a second arm 23C. In accordance with changes in the angle between the first arm 23B and the second arm 23C, the connecting spring portion 23A elastically twists and deforms. The first arm 23B is mounted on a predetermined portion of the locking mechanism 8, and the second arm 23C is mounted on a mounting pin 24A of the return plate 24.

Return Plate 24

The return plate 24 includes the mounting pin 24A, a mounting hole 24B, and a through hole 24C. The mounting hole 24B is mounted on the head of the rivet 22. Further, the guide pin 21B of the pawl 21 is inserted into the through hole 24C of the return plate 24 to couple the pawl 21 and the return plate 24 to each other. The pawl 21 and the return plate 24 rotate about the boss 21C and the rivet 22, and are integrally displaced in the rotation direction. The return spring 23 applies, with the second arm 23C, force to the mounting pin 24A of the return plate 24, so that the return plate 24 biases the guide pin 21B of the pawl 21. The pawl 21 and the return plate 24 biased by the return spring 23 are displaced in the biasing direction of the return spring 23.

Locking Mechanism 8

The locking mechanism 8 (see FIG. 2) is disposed at the first side wall 3C of the housing 3A, and is coupled to the guide pin 21B of the pawl 21. The locking mechanism 8 causes the guide pin 21B and the pawl 21 to shift, and the pawl 21 is displaced to be positioned inside or outside the pawl storage portion 3G. Thus, the pawl 21 leaves or approaches the ratchet gear 7. Further, the pawl 21 is displaced to be positioned at a non-locking position (the position inside the pawl storage portion 3G) where the spool 10 is not locked or at a locking position (the position outside the pawl storage portion 3G) where the spool 10 is locked.

Figure 6:
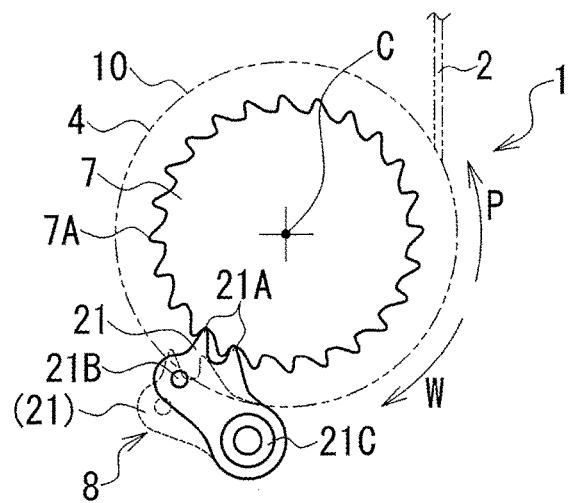
FIG. 6 is a front view schematically showing a pawl and a ratchet gear.

FIG. 6 is a front view schematically showing the pawl 21 and the ratchet gear 7. In FIG. 6, the pawl 21 at the locking position is represented by solid lines, and the pawl 21 at the non-locking position is represented by broken lines.

As shown in the drawing, the non-locking position is the rest position where the pawl 21 does not engage with the ratchet teeth 7A of the ratchet gear 7, and the locking position is the engaging position where the pawl 21 engages with the ratchet teeth 7A of the ratchet gear 7. The ratchet gear 7 has the plurality of ratchet teeth 7A that engage with the claws 21A of the pawl 21. The ratchet teeth 7A are formed along the entire outer circumference of the ratchet gear 7.

In emergency of the vehicle, the locking mechanism 8 shifts the pawl 21 from the non-locking position (the rest position) to the locking position (the engaging position) in response to acceleration of the vehicle or acceleration of the webbing 2 being pulled out. Thus, the claws 21A of the pawl 21 engage with the ratchet teeth 7A of the ratchet gear 7, that is, the pawl 21 engages with the ratchet gear 7. The locking mechanism 8 prevents, with the pawl 21, the ratchet gear 7 from rotating in the extracting direction P, thereby locking the ratchet gear 7 and the spool 10. Accordingly, the pawl 21 structures part of the locking mechanism 8.

The pawl 21 and the ratchet gear 7 engage with each other only when the spool 10 rotates in the extracting direction P, and the ratchet teeth 7A and the claws 21A prevent the ratchet gear 7 just from rotating in the extracting direction P. When the claws 21A are disengaged from the ratchet teeth 7A, the engagement between the pawl 21 and the ratchet gear 7 is released. Further, when the pawl 21 leaves the ratchet gear 7 to be positioned at the non-locking position, the locking to prevent the ratchet gear 7 and the spool 10 from rotating in the extracting direction P is released. Thus, the webbing 2 can be pulled out or wound up.

Spool Unit 4

Figure 7:
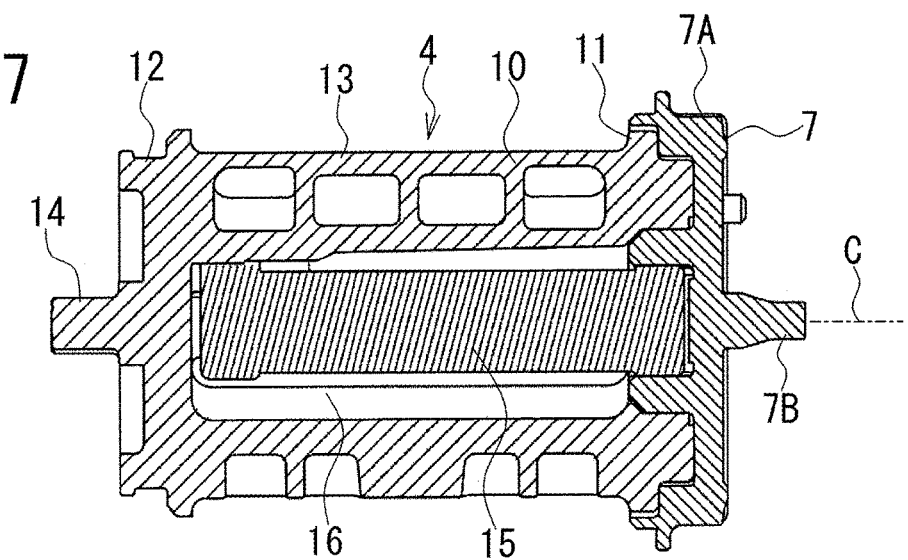
FIG. 7 is a cross-sectional view of a spool unit.

FIG. 7 is a cross-sectional view of the spool unit 4 taken along a plane including the center line C.

As shown in the drawing, the spool unit 4 includes the ratchet gear 7, the spool 10, and a circular cylindrical torsion bar 15. The ratchet gear 7 has a shaft (ratchet gear shaft) 7B at its center, and the spool 10 has a center hole 16 formed along the center line C. The center hole 16 is closed at the second end 12 of the spool 10, and opens at the first end 11 of the spool 10. The ratchet gear shaft 7B and the spool shaft 14 of the spool 10 are positioned on the center line C of the spool 10, and the spool unit 4 is rotatably supported by the ratchet gear shaft 7B and the spool shaft 14.

Torsion Bar 15

The torsion bar 15 is mounted on the spool 10 and on the ratchet gear 7 to couple the spool 10 and the ratchet gear 7 to each other so as to be incapable of rotating relative to each other. The torsion bar 15 is, for example, made of steel, and is inserted into the center hole 16 of the spool 10. One end of the torsion bar 15 is fixed to the second end 12 of the spool 10 in the center hole 16, and the other end of the torsion bar 15 is fixed to the center portion of the ratchet gear 7. The ratchet gear 7 being fixed to the torsion bar 15 is mounted on the first end 11 of the spool 10. When the pulling load on the webbing 2 is less than a predetermined value, the torsion bar 15 allows the ratchet gear 7 to rotate and stop together with the spool 10, and stops the rotation of the spool 10 by stopping the rotation of the ratchet gear 7. Note that, the pulling load of the webbing 2 is a load put on the webbing 2 by movement of the occupant.

The torsion bar 15 is an energy absorption member, and absorbs kinetic energy of the occupant in emergency of the vehicle. When the occupant wearing the webbing 2 shifts forward in the vehicle while the locking mechanism 8 (the pawl 21) is preventing the ratchet gear 7 from rotating in the extracting direction P, a force (a pulling load) is applied from the occupant to the webbing 2. When the pulling load on the webbing 2 becomes equal to or greater than a predetermined value, the torsion bar 15 plastically deforms (herein, torsionally deforms) by the rotational torque in the extracting direction P acting on the spool 10. The torsion bar 15 rotates the spool 10 in the extracting direction P while plastically deforming. In this manner, the plastic deformation of the torsion bar 15 allows the spool 10 to rotate in the extracting direction P. Thus, the webbing 2 is pulled out from the spool 10 to absorb the kinetic energy of the occupant.

Locking Unit 6

Figure 8:
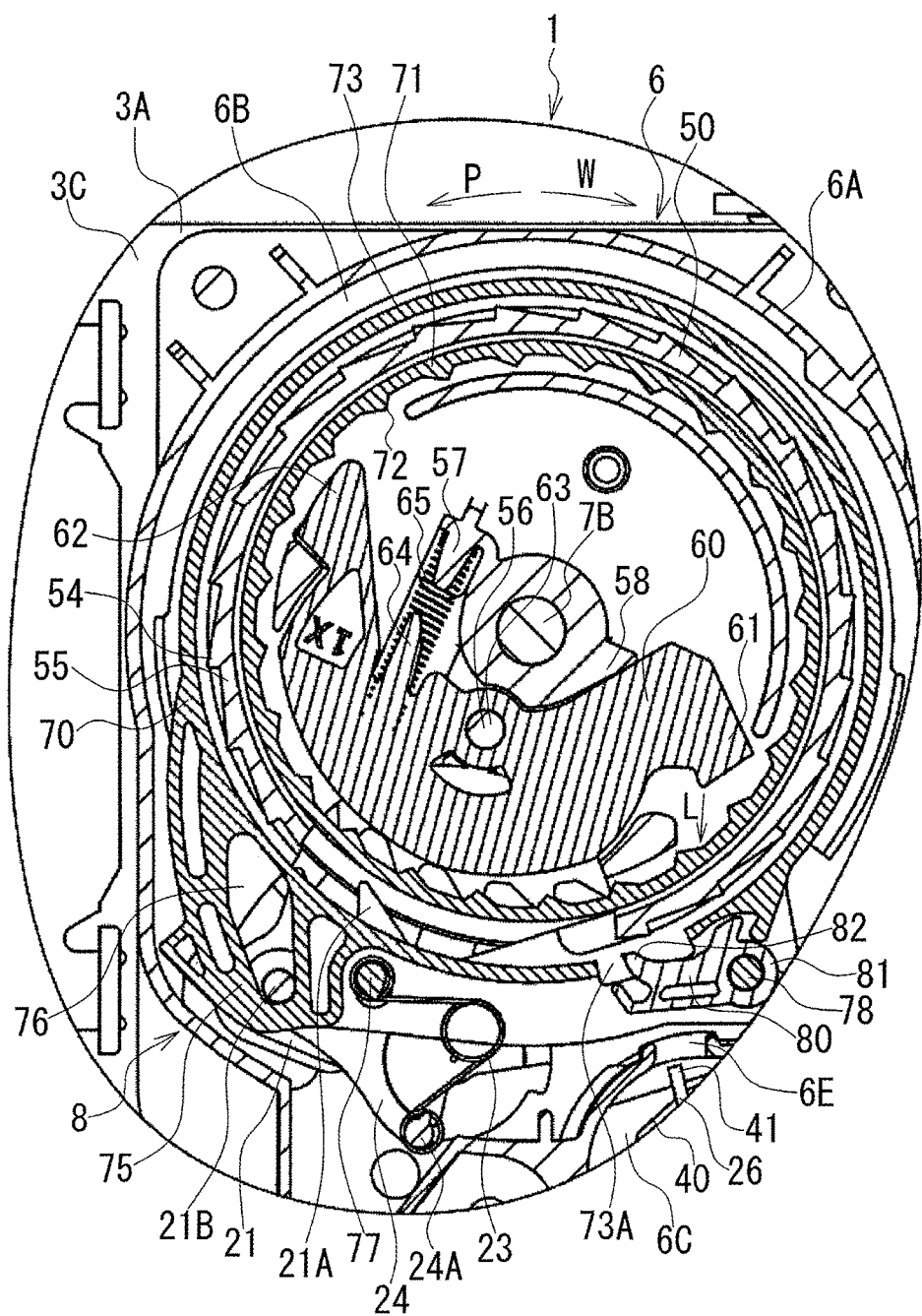
FIG. 8 is a cross-sectional view of the locking unit as seen from direction X in FIGS. 1A and 1B.
Figure 9:
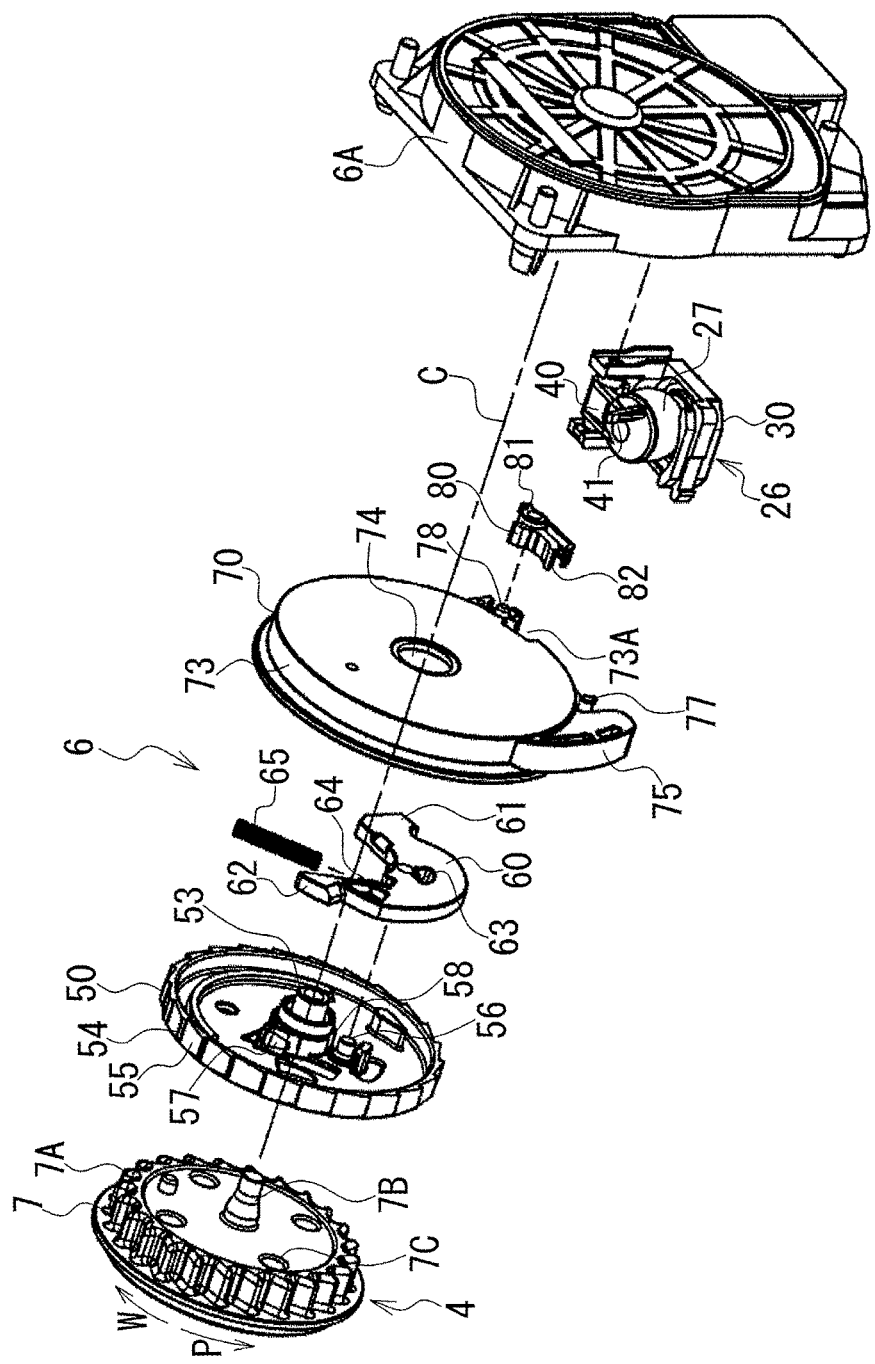
FIGS. 9 and 10 are each an exploded perspective view of the locking unit.
Figure 10:
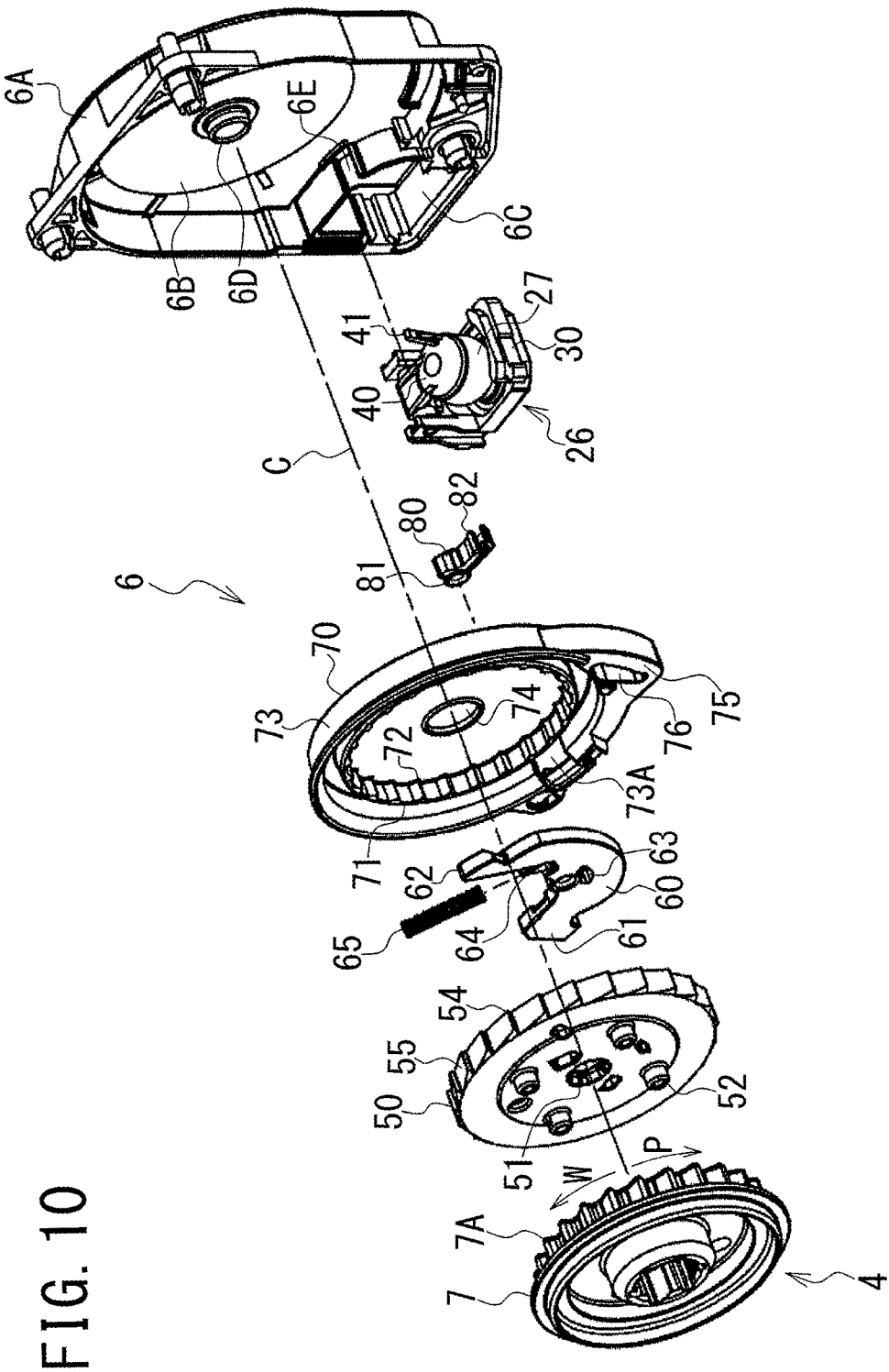

FIG. 8 is a cross-sectional view of the locking unit 6 as seen from direction X in FIG. 1, in its normal state (the state where the pawl 21 is disposed in the non-locking position). FIGS. 9 and 10 are each an exploded perspective view of the locking unit 6, showing the locking unit 6 and the ratchet gear 7 of the spool unit 4 as seen from different directions.

As shown in the drawings, the locking unit 6 includes a mechanism cover 6A, a circular locking gear 50, a locking arm 60, a sensor spring 65, a clutch 70, and a locking pawl 80.

Mechanism Cover 6A

The mechanism cover 6A includes a first housing portion 6B that houses the locking mechanism 8, a second housing portion 6C that houses the acceleration sensor 26, and a cylindrical bearing boss 6D. The first housing portion 6B houses the locking gear 50, the locking arm 60, and the clutch 70 structuring part of the locking mechanism 8. The acceleration sensor 26 is inserted into the second housing portion 6C, thereby mounted on the second housing portion 6C. The projection 41 of the sensor lever 40 shifts between the first housing portion 6B and the second housing portion 6C through an insertion hole 6E of the second housing portion 6C.

Locking Gear 50

The locking gear 50 includes a shaft hole 51 formed at its center, a plurality of fitting portions 52, a shaft (locking gear shaft) 53 projecting from its center, and a locking gear wheel 55 provided with a plurality of locking gear teeth 54. The ratchet gear shaft 7B of the ratchet gear 7 is inserted into the shaft hole 51, and the plurality of fitting portions 52 fit into a plurality of recesses 7C of the ratchet gear 7. Thus, the locking gear 50 is mounted on the ratchet gear 7, and integrally rotates with the spool unit 4 (the spool 10). The locking gear shaft 53 is inserted into the bearing boss 6D of the mechanism cover 6A and is rotatably supported by the bearing boss 6D.

Figure 11:
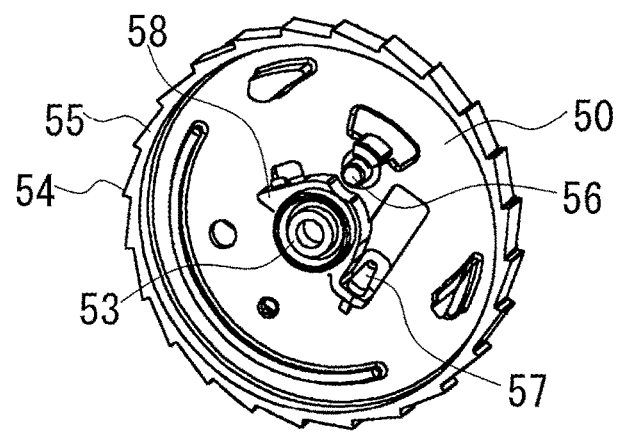
FIG. 11 is a perspective view of a locking gear.

FIG. 11 is a perspective view of the locking gear 50.

As shown in the drawing, the locking gear wheel 55 is an annular member formed along the outer circumference of the locking gear 50, and the plurality of locking gear teeth 54 are formed along the entire outer circumference of the locking gear wheel 55. Further, the locking gear 50 includes a circular cylindrical arm support 56, a support pin 57 that supports the sensor spring 65, and an arm stopper 58 that limits displacement of the locking arm 60. The locking arm 60 (see FIGS. 8 to 10) is displaceably coupled to the locking gear 50 on the inner side relative to the annular locking gear wheel 55.

Locking Arm 60

The locking arm 60 includes an insertion hole 63 formed between a first end (engaging end) 61 and a second end (free end) 62 in the longitudinal direction and has a curved shape. Inserting the arm support 56 into the insertion hole 63 allows the locking arm 60 to be mounted on the arm support 56. The arm support 56 rotatably supports the locking arm 60 and rotatably couples the locking arm 60 to the locking gear 50.

The locking arm 60 is disposed on the inner side relative to the locking gear wheel 55 and rotates about the arm support 56. The sensor spring 65 is disposed between the support pin 64 of the locking arm 60 and the support pin 57 of the locking gear 50 and biases the second end 62 of the locking arm 60 in the extracting direction P of the webbing 2. The biasing of the sensor spring 65 causes displacement of the second end 62 of the locking arm 60 in the direction counter to a predetermined locking operation direction L (see FIG. 8). The portion on the first end 61 side of the locking arm 60 is brought into contact with the arm stopper 58 of the locking gear 50 and stops thereby.

Clutch 70

The clutch 70 rotates within a certain rotation range, while being interposed between the locking gear 50 and the mechanism cover 6A in the first housing portion 6B. Further, the clutch 70 includes an annular inner wall 71, a clutch gear 72 formed along the inner circumference of the inner wall 71, an annular outer wall 73 surrounding the inner wall 71, and a center hole 74 positioned at the center of the inner wall 71. The locking gear shaft 53 of the locking gear 50 is inserted into the center hole 74, and the locking gear 50 and the spool unit 4 rotate relative to the clutch 70.

The locking gear wheel 55 of the locking gear 50 is disposed between the inner wall 71 and the outer wall 73, and the locking arm 60 is disposed on the inner side relative to the inner wall 71. When the spool 10 is locked, the first end 61 of the locking arm 60 engages with engaging teeth formed along the inner circumference of the clutch gear 72. In this state, the clutch 70 rotates in the extracting direction P integrally with the locking gear 50 and the locking arm 60.

The clutch 70 includes a guide portion 75 formed on the outer side relative to the outer wall 73, and an elongated guide groove 76 formed at the guide portion 75. The guide pin 21B of the pawl 21 is inserted into the guide groove 76 and is guided by the guide portion 75 in accordance with the rotation of the clutch 70. The guide portion 75 forcibly shifts the guide pin 21B of the pawl 21 in the guide groove 76. Normally, the clutch 70 is biased in the retracting direction W of the webbing 2 by the return spring 23, and the guide pin 21B of the pawl 21 is biased in a direction in which the pawl 21 leaves the ratchet gear 7. Therefore, the guide pin 21B of the pawl 21 is disposed at one end of the guide groove 76, and the pawl 21 is maintained in the non-locking position.

Figure 12:
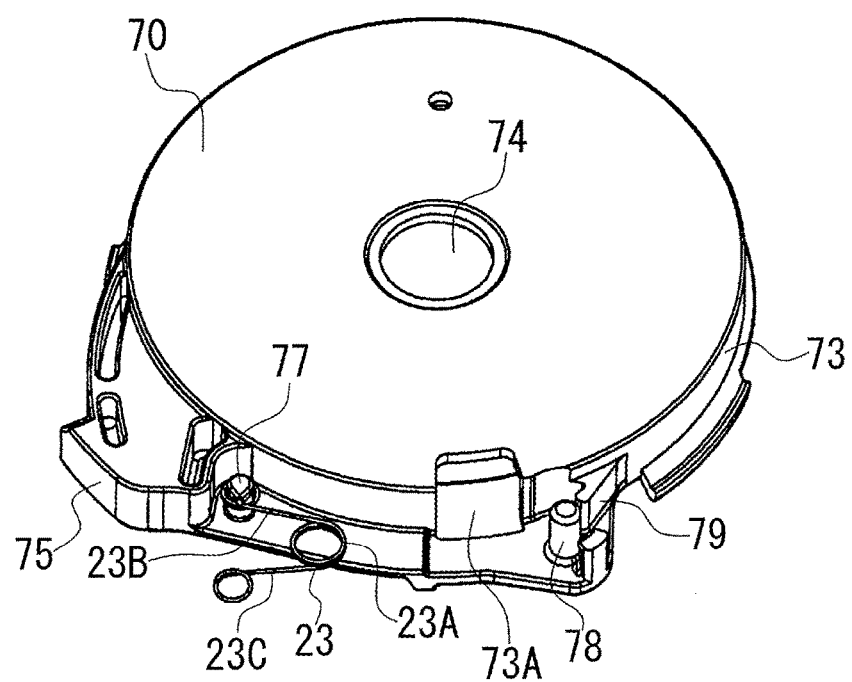
FIG. 12 is a perspective view of a clutch.
Figure 13:
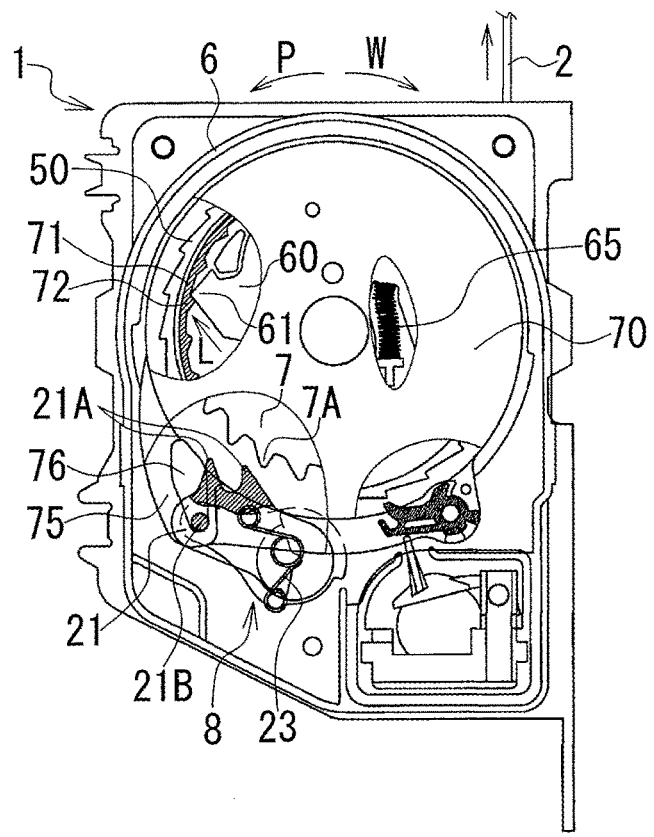
FIGS. 13 to 19 are each a diagram showing an operation of a locking mechanism.

FIG. 12 is a perspective view of the clutch 70.

As shown in the drawing, the clutch 70 includes a locking pin 77, a circular cylindrical pawl support pin 78, and a stopper 79 each formed on the outer side relative to the outer wall 73. The locking pin 77 is formed between the guide portion 75 and the pawl support pin 78, and the first arm 23B of the return spring 23 is mounted on the locking pin 77. The locking pawl 80 is supported by the pawl support pin 78, and comes into contact with the stopper 79 (see FIGS. 8 and 9).

Locking Pawl 80

The locking pawl 80 includes a cylindrical attaching portion 81, and a claw 82 that engages with the locking gear teeth 54 of the locking gear wheel 55. The pawl support pin 78 is inserted into the attaching portion 81, so that the locking pawl 80 is mounted on the pawl support pin 78. The pawl support pin 78 rotatably supports the locking pawl 80 and rotatably mounts the locking pawl 80 on the clutch 70. When the locking pawl 80 rotates by its own weight to be displaced downward, the locking pawl 80 stops by being brought into contact with the stopper 79. In this state, the claw 82 is disposed in a hole 73A of the outer wall 73.

An acceleration of the vehicle being equal to or greater than a predetermined value causes upward displacement of the projection 41 of the acceleration sensor 26. The locking pawl 80 is pushed upward by the projection 41 and rotates about the attaching portion 81. Thus, the locking pawl 80 is displaced upward, and the claw 82 of the locking pawl 80 engages with the locking gear teeth 54 of the locking gear wheel 55. The locking pawl 80 engaging with the locking gear teeth 54 couples the clutch 70 to the locking gear 50.

Next, a description will be given of the operation of the retractor 1.

The locking arm 60 rotates in the extracting direction P or the retracting direction W together with the spool 10 and the locking gear 50. Normally, the sensor spring 65 biases the locking arm 60 to be in contact with the arm stopper 58, so that the first end 61 of the locking arm 60 is kept spaced apart from the clutch gear 72. Accordingly, the clutch 70 is not coupled to the locking gear 50, and the locking mechanism 8 is not activated. As the webbing 2 is pulled out, the spool 10 and the locking gear 50 rotate in the extracting direction P relative to the stationary clutch 70.

On the other hand, when an acceleration of a predetermined value or greater acts on the vehicle, the locking mechanism 8 is activated and locks the spool 10. Specifically, when sudden pull-out of the webbing 2 causes an acceleration of the pulled-out webbing 2 of a predetermined value or greater (that is, when an acceleration of the spool 10 rotating in the extracting direction P becomes equal to or greater than a predetermined value), an inertia force hinders the first end 61 of the locking arm 60 from following the rotation of the spool 10 and the locking gear 50. As a result, delay due to the inertia occurs at the first end 61 of the locking arm 60 relative to the rotating locking gear 50, whereby the first end 61 of the locking arm 60 is displaced. In accordance therewith, the locking arm 60 is displaced in the predetermined locking operation direction L (see FIG. 8) against the biasing force of the sensor spring 65 and activates the locking mechanism 8.

In this manner, the locking arm 60 and the sensor spring 65 structure part of an acceleration detection mechanism (a second acceleration detection mechanism) that detects a pull-out acceleration of the webbing 2 being pulled out from the spool 10 (i.e., an acceleration of the spool 10 in the extracting direction P). The second acceleration detection mechanism detects an acceleration of the webbing 2 being pulled out in emergency of the vehicle and activates the locking mechanism 8.

FIGS. 13 to 16 are each a diagram showing the operation (locking operation) of the locking mechanism 8, in which part of the locking unit 6 is omitted to show the internal structure of the retractor 1.

As shown in the drawings, when a sudden pull-out of the webbing 2 causes an acceleration of the spool 10 in the extracting direction P of a predetermined value or greater, the locking arm 60 rotates while compressing the sensor spring 65, and is displaced in the locking operation direction L. Thus (see FIG. 13), the first end 61 of the locking arm 60 is displaced in the radially outward direction of the locking gear 50 to engage with the clutch gear 72. Further, the clutch 70 is connected to the locking gear 50 (the ratchet gear 7 and the spool 10) by the locking arm 60 to rotate in the extracting direction P of the webbing 2 together with the locking gear 50 and the spool 10.

Figure 14:
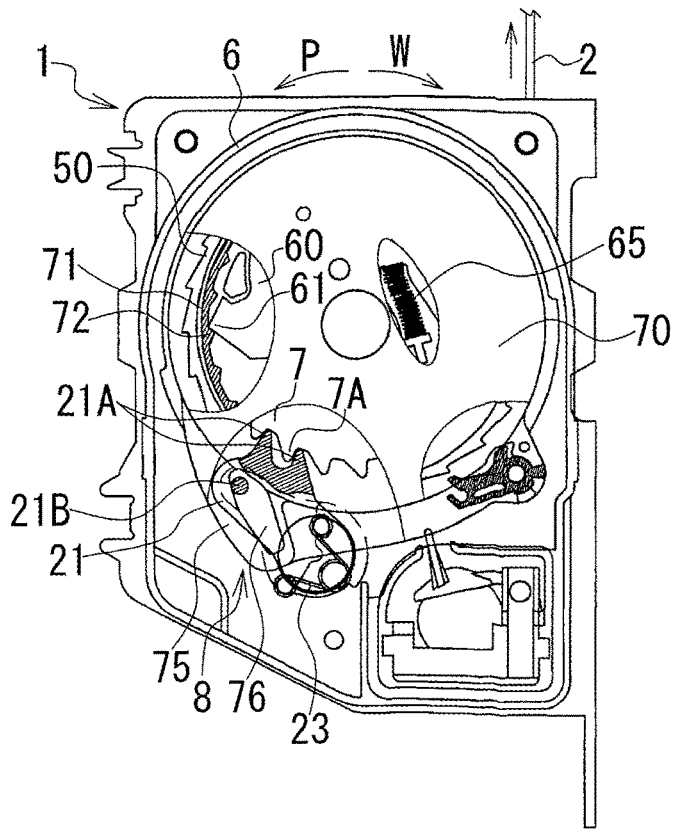
Figure 15:
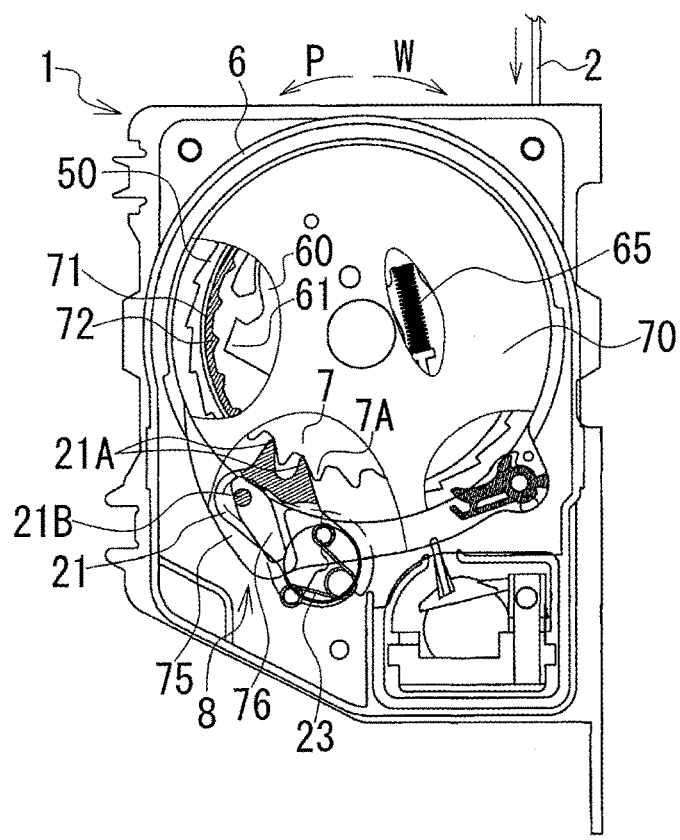
Figure 16:
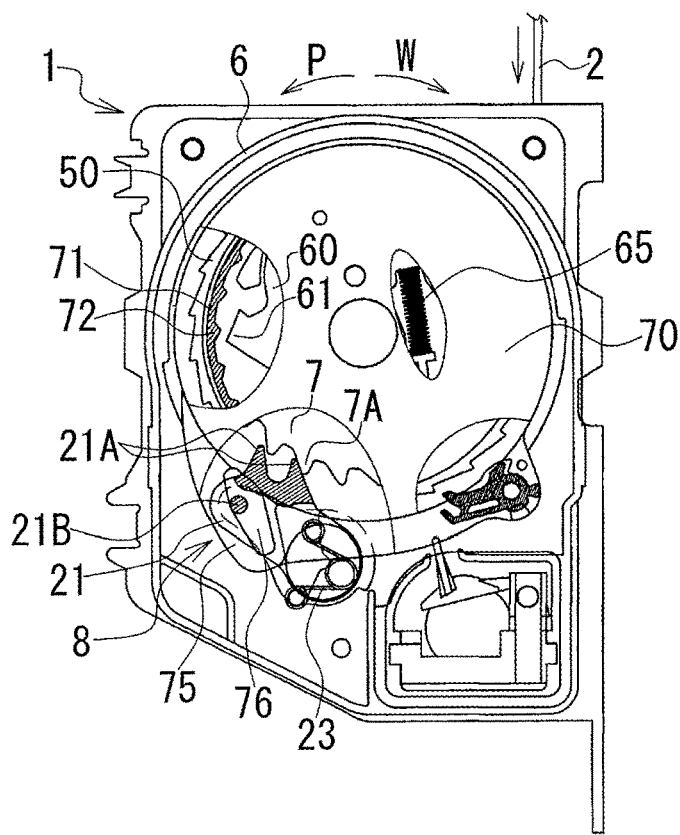

In accordance with the rotation of the clutch 70, the guide pin 21B of the pawl 21 is guided by the guide portion 75 of the clutch 70 to shift toward the center of the clutch 70 in the guide groove 76 (see FIG. 14). The shifting of the guide pin 21B causes displacement of the pawl 21 to the locking position, whereby the claws 21A of the pawl 21 engage with the ratchet teeth 7A of the ratchet gear 7. In this manner, the pawl 21 is displaced by the rotating clutch 70 from the non-locking position to the locking position, and the locking mechanism 8 locks, with the pawl 21, the ratchet gear 7 and the spool 10. The locking mechanism 8 prevents, with the pawl 21, the spool 10 from rotating in the extracting direction P, thereby stopping the pull-out of the webbing 2.

Subsequently, when the pulling of the webbing 2 is released, the winding spring unit 5 causes the spool 10 and the locking gear 50 to rotate in the retracting direction W of the webbing 2, so that the spool 10 winds up the webbing 2. In the state where the pawl 21 is disposed at the locking position, the clutch 70 is biased by the return spring 23 in the extracting direction P of the webbing 2 and does not rotate in the retracting direction W. Accordingly, the locking gear 50 rotates together with the locking arm 60 in the retracting direction W relative to the stationary clutch 70. In accordance therewith, the first end 61 of the locking arm 60 becomes disengaged from the clutch gear 72, releasing the connection between the clutch 70 and the locking gear 50 (see FIG. 15).

The ratchet gear 7 rotates together with the spool 10 in the retracting direction W of the webbing 2. Simultaneously, the claws 21A of the pawl 21 are guided by the ratchet teeth 7A of the ratchet gear 7, whereby the pawl 21 is displaced from the locking position toward the non-locking position (see FIG. 16). Further, the guide pin 21B of the pawl 21 pushes the guide portion 75 of the clutch 70, causing the clutch 70 to rotate in the retracting direction W.

In response to the clutch 70 rotating in the retracting direction W, the biasing direction of the return spring 23 on the clutch 70 changes from the extracting direction P of the webbing 2 to the retracting direction W. This causes the clutch 70 to rotate in the retracting direction W, and the pawl 21 is displaced to the non-locking position (see FIG. 8). The displacement of the pawl 21 releases the engagement between the claws 21A and the ratchet teeth 7A, whereby the locking exerted by the locking mechanism 8 on the spool 10 is released. Further, the pawl 21 returns to the non-locking position, and the clutch 70 returns to the original state. In the state where the pawl 21 is disposed at the non-locking position, the clutch 70 is biased in the retracting direction W of the webbing 2 by the return spring 23. In this state, the webbing 2 can be freely pulled out or wound up.

As has been described above, the locking mechanism 8 is a webbing-sensitive locking mechanism having the locking arm 60 and stops pull-out of the webbing 2 in response to sudden pull-out of the webbing 2. Further, the retractor 1 includes the acceleration sensor 26 in addition to the locking arm 60 (see FIGS. 9 and 10). The locking mechanism 8 also serves as a vehicle-sensitive locking mechanism activated by the acceleration sensor 26 and stops pull-out of the webbing 2 in response to a sudden change in the speed of the vehicle.

The locking mechanism 8, the locking pawl 80, and the acceleration sensor 26 structure the vehicle-sensitive locking mechanism. Normally (see FIG. 8), the locking pawl 80 is disposed at the position where it does not engage with the locking gear teeth 54 of the locking gear wheel 55 (the position spaced apart from the locking gear wheel 55), and the projection 41 of the sensor lever 40 is positioned in close proximity to the locking pawl 80. In this state, when an acceleration of a predetermined value or greater acts on the vehicle, the acceleration sensor 26 activates, with the locking pawl 80, the locking mechanism 8, and the locking mechanism 8 locks the spool 10.

Figure 17:
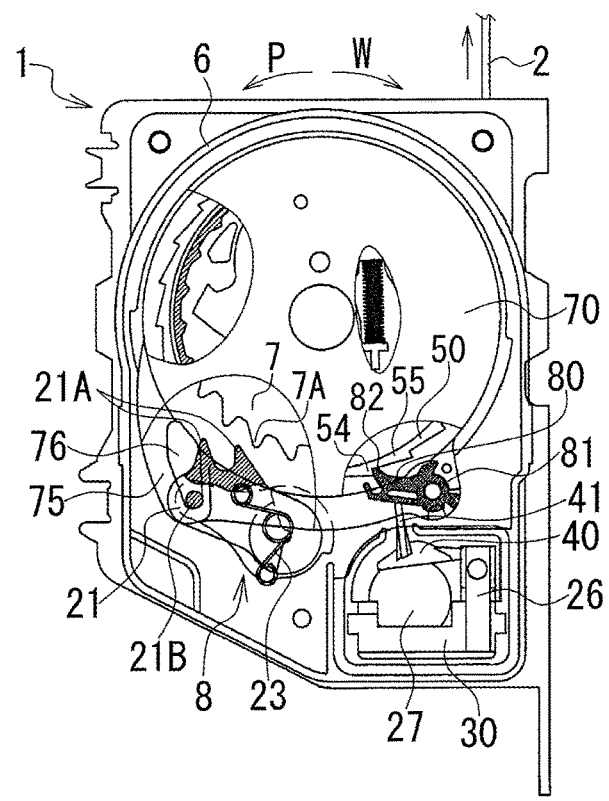
Figure 18:
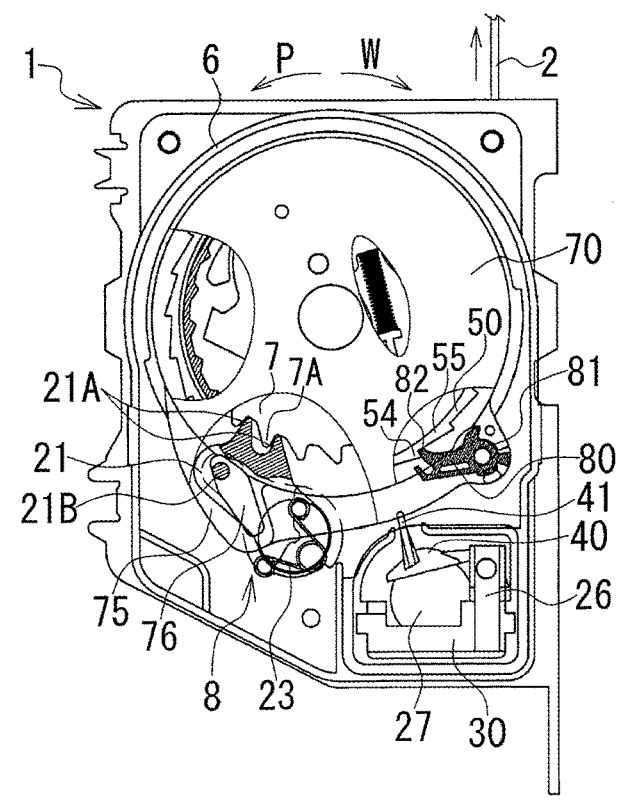
Figure 19:
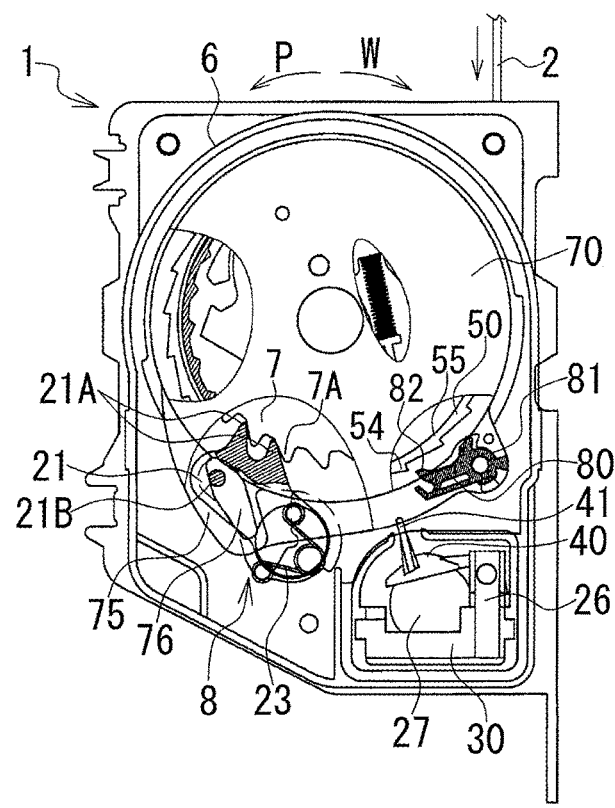

FIGS. 17 to 19 are each a diagram showing the operation (locking operation) of the locking mechanism 8, in which part of the locking unit 6 is omitted to show the internal structure of the retractor 1.

As shown in the drawings, when an acceleration of a predetermined value or greater acts on the vehicle, the inertia mass 27 of the acceleration sensor 26 is displaced on the sensor holder 30 by an inertia force while being held between the sensor holder 30 and the sensor lever 40 (see FIG. 17). That is, the acceleration sensor 26 detects the acceleration of a predetermined value or greater from the displacement of the inertia mass 27 and lets the projection 41 of the sensor lever 40 be upwardly displaced by the inertia mass 27. The projection 41 pushes the locking pawl 80 upward, so that the locking pawl 80 (the claw 82) engages with the locking gear teeth 54 of the locking gear wheel 55. The locking pawl 80 is part of the locking mechanism 8, and the locking mechanism 8 is activated by the displacement of the locking pawl 80.

Engaging the locking pawl 80 with the locking gear teeth 54 of the locking gear wheel 55 connects the clutch 70 to the locking gear 50. Subsequently, when the webbing 2 is pulled out, the clutch 70 rotates in the extracting direction P of the webbing 2 together with the locking gear 50 and the spool 10, while the locking pawl 80 is engaged with the locking gear teeth 54.

In accordance with the rotation of the clutch 70, the guide pin 21B of the pawl 21 is guided by the guide portion 75 of the clutch 70, to shift toward the center of the clutch 70 in the guide groove 76 (see FIG. 18). The shifting of the guide pin 21B causes displacement of the pawl 21 from the non-locking position to the locking position, whereby the claws 21A of the pawl 21 engage with the ratchet teeth 7A of the ratchet gear 7. The locking mechanism 8 locks, with the pawl 21, the ratchet gear 7 and the spool 10. The locking mechanism 8 prevents, with the pawl 21, the spool 10 from rotating in the extracting direction P, thereby stopping the pull-out of the webbing 2.

When the acceleration of the vehicle becomes smaller than the predetermined value, the inertia mass 27 is displaced to the original position by gravity, and the sensor lever 40 and the projection 41 are displaced downward by their own weight. Subsequently, when the pulling of the webbing 2 is released, the winding spring unit 5 causes the spool 10 and the locking gear 50 to rotate in the retracting direction W of the webbing 2, so that the spool 10 winds up the webbing 2. At this time, as described above, the clutch 70 is biased in the extracting direction P by the return spring 23 and does not rotate in the retracting direction W. Accordingly, the locking gear 50 rotates in the retracting direction W relative to the stationary clutch 70. In accordance therewith, the locking pawl 80 becomes disengaged from the locking gear teeth 54 of the locking gear wheel 55 and is displaced downward by its own weight. As a result, the connection between the clutch 70 and the locking gear 50 is released (see FIG. 19).

The ratchet gear 7 rotates together with the spool 10 in the retracting direction W of the webbing 2. Simultaneously, the claws 21A of the pawl 21 are guided by the ratchet teeth 7A of the ratchet gear 7, whereby the pawl 21 is displaced from the locking position toward the non-locking position. Further, the guide pin 21B of the pawl 21 pushes the guide portion 75 of the clutch 70, causing the clutch 70 to rotate in the retracting direction W.

In response to the clutch 70 rotating in the retracting direction W, the biasing direction of the return spring 23 on the clutch 70 changes from the extracting direction P of the webbing 2 to the retracting direction W. This causes the clutch 70 to rotate in the retracting direction W, and the pawl 21 is displaced to the non-locking position (see FIG. 8). The displacement of the pawl 21 releases the engagement between the claws 21A and the ratchet teeth 7A, thereby releasing the locking exerted by the locking mechanism 8 on the spool 10. Further, the pawl 21 returns to the non-locking position, and the clutch 70 returns to the original state.

Next, the acceleration sensor 26 of the retractor 1 will be described in more detail.

Figure 20:
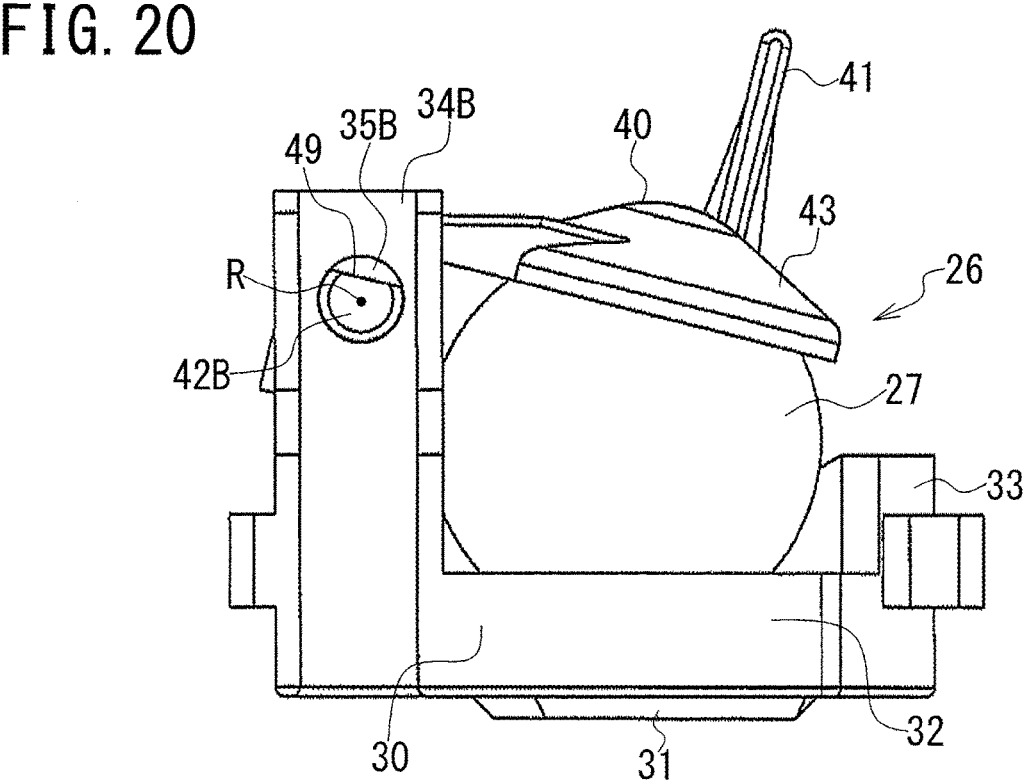
FIG. 20 is a side view of an acceleration sensor.
Figure 21:
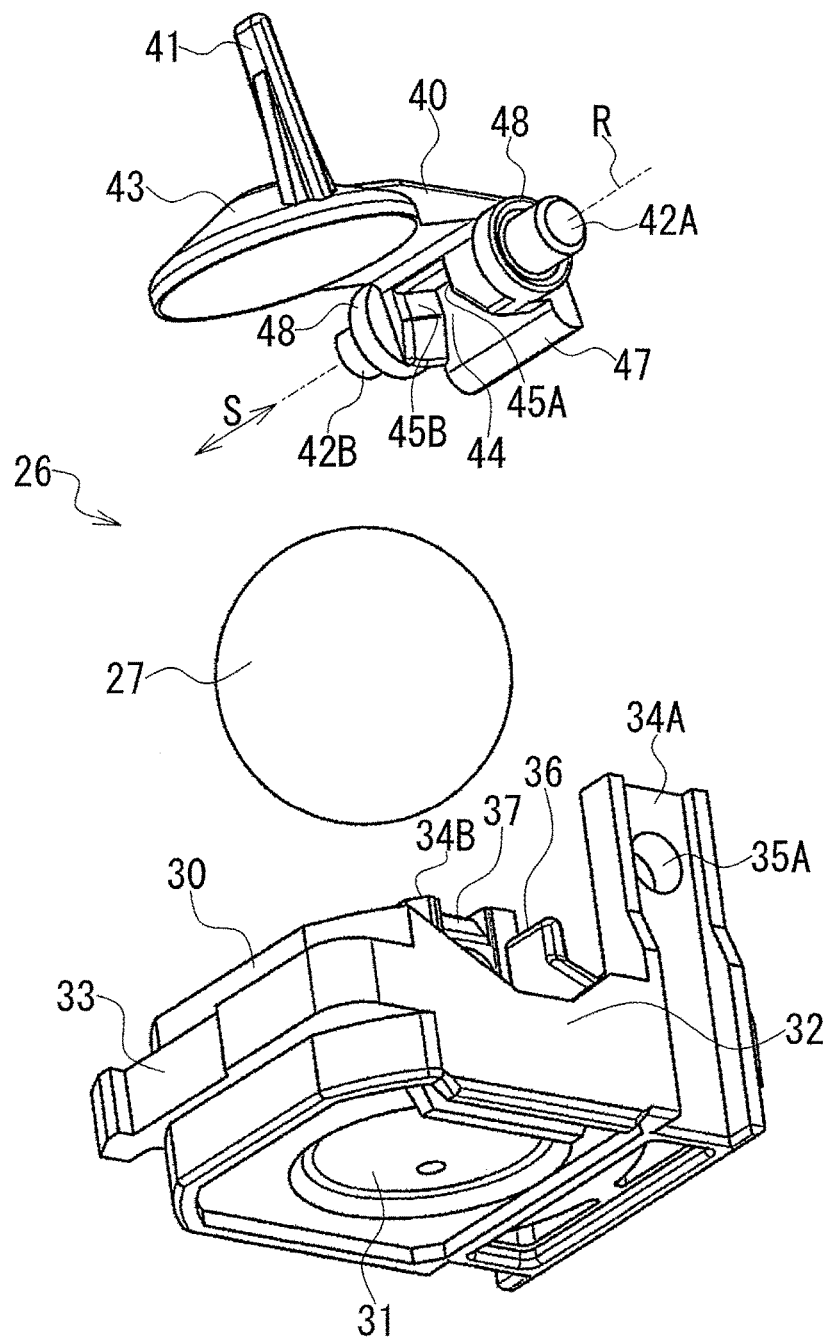
FIGS. 21 and 22 are each an exploded perspective view of the acceleration sensor.
Figure 22:
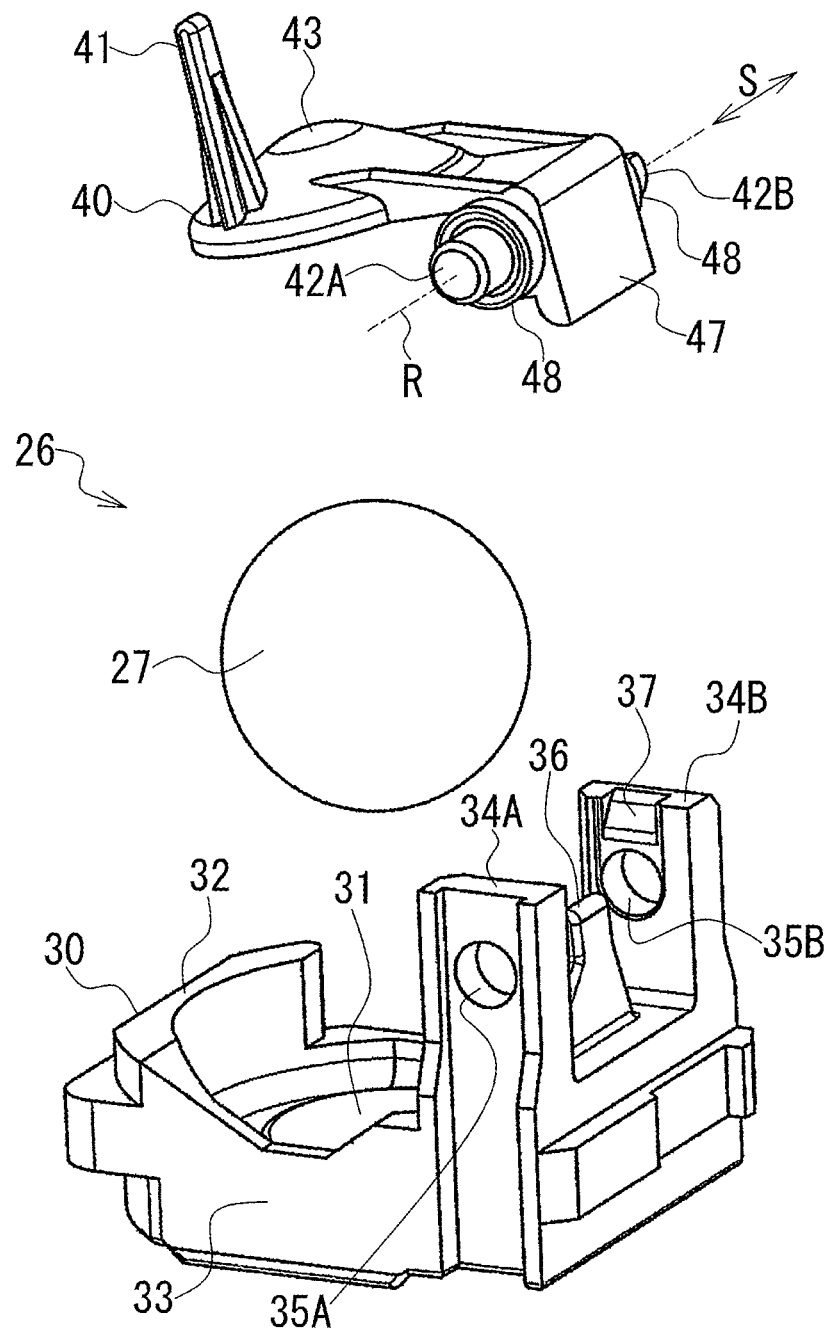
Figure 23:
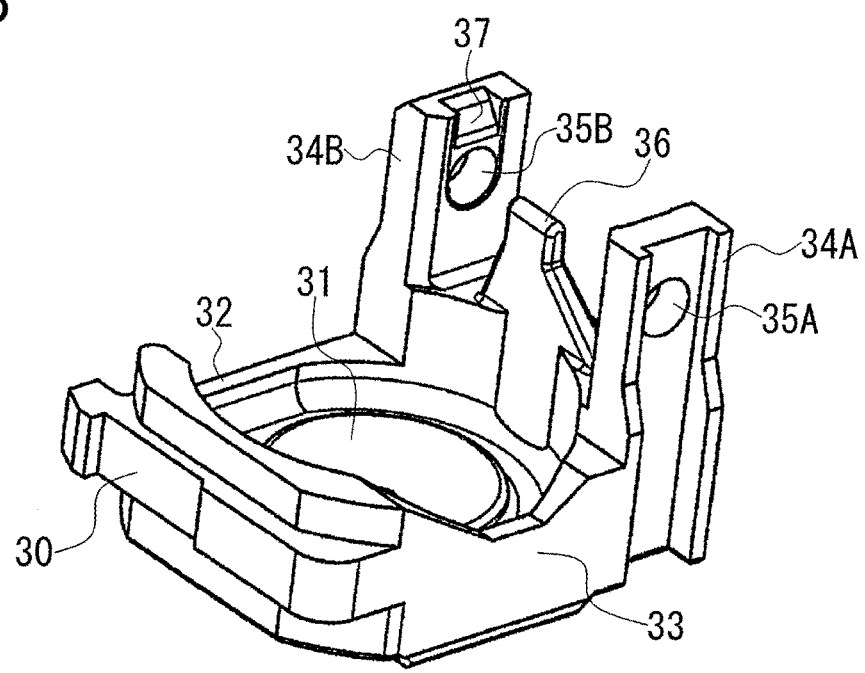
FIG. 23 is a perspective view of a sensor holder of the acceleration sensor.
Figure 24:
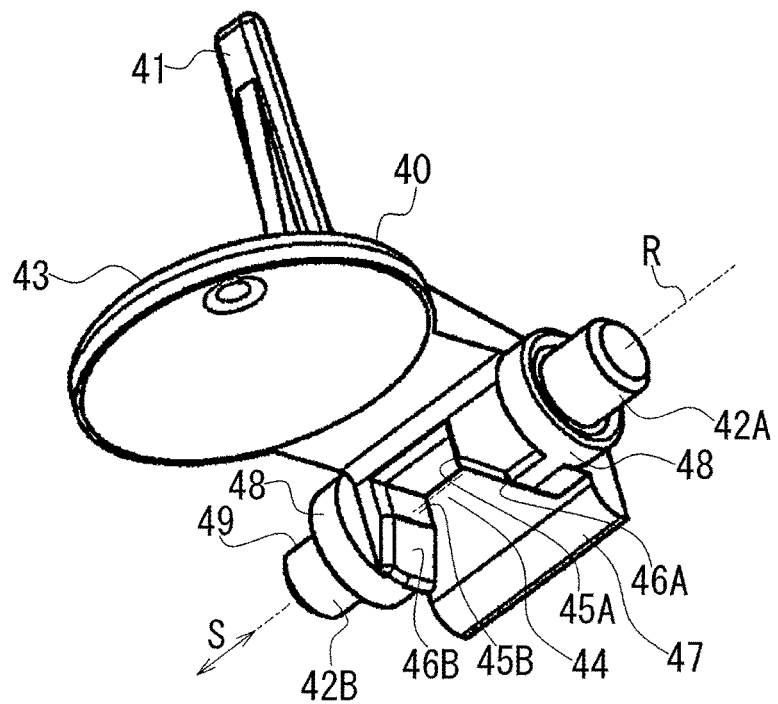
FIGS. 24 and 25 are each a perspective view of a sensor lever of the acceleration sensor.
Figure 25:
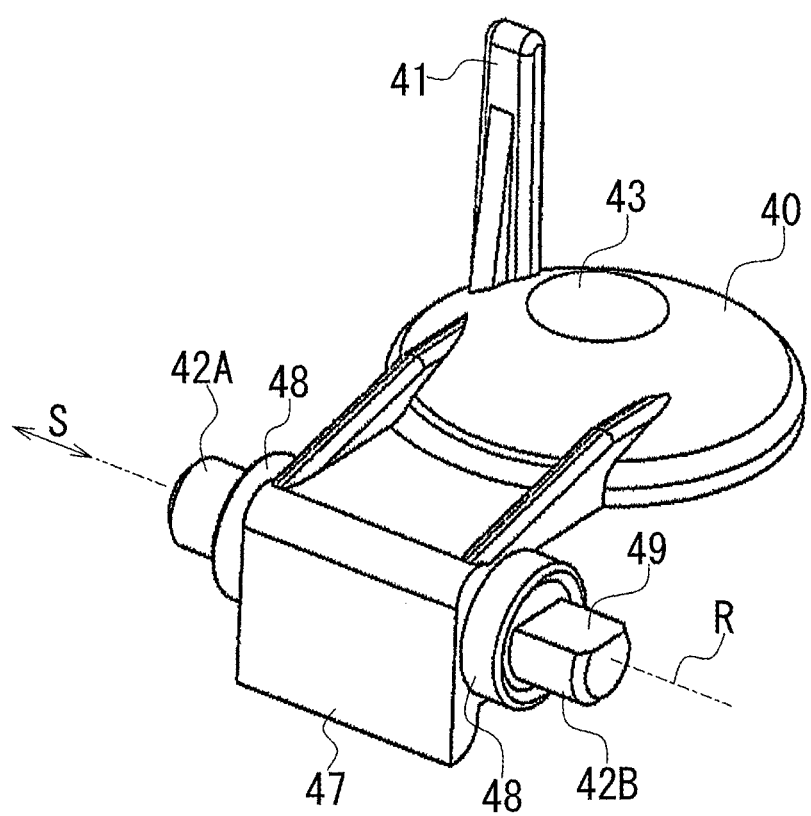

FIG. 20 is a side view of the acceleration sensor 26. FIGS. 21 and 22 are each an exploded perspective view of the acceleration sensor 26, showing the acceleration sensor 26 as seen from different directions. FIG. 23 is a perspective view showing the sensor holder 30 of the acceleration sensor 26. FIGS. 24 and 25 are each a perspective view showing the sensor lever 40 of the acceleration sensor 26, showing the sensor lever 40 as seen from different directions.

As shown in the drawings, the sensor holder 30 includes a mounting portion 31 on which the inertia mass 27 is placed, a peripheral wall 32 surrounding the mounting portion 31, an accommodating portion 33 accommodating the inertia mass 27, a pair of supports 34A and 34B, a pair of support holes 35A and 35B formed at the supports 34A and 34B, a limiting portion 36 limiting shifting of the sensor lever 40, and a slope 37. The accommodating portion 33 is a recess structured by the mounting portion 31 and the annular peripheral wall 32 and accommodates the inertia mass 27 within the space defined by the peripheral wall 32. The inertia mass 27 is displeaceably accommodated in the accommodating portion 33 and is displaced on the mounting portion 31.

The supports 34A and 34B are pillars projecting in the same direction from the mounting portion 31 and are juxtaposed to each other with a space between them. The support holes 35A and 35B are respectively circular holes formed at the tip ends of the supports 34A and 34B. The respective centers of the support holes 35A and 35B in the radial direction are positioned on an identical line. The limiting portion 36 is a protrusion provided between the supports 34A and 34B. The limiting portion 36 projects from the mounting portion 31 in the projecting direction of the supports 34A and 34B, and is disposed with a space from each of the supports 34A and 34B. The tip of the limiting portion 36 is positioned on the line that passes through the centers of the support holes 35A and 35B.

The sensor lever 40 includes the projection 41, a pair of shafts 42A and 42B, a cup-like cover portion 43, a cavity 44 positioned between the shafts 42A and 42B, a pair of contact portions 45A and 45B brought into contact with the limiting portion 36 of the sensor holder 30, a pair of tapered portions 46A and 46B, a rotation stopper 47, and bases 48. The limiting portion 36 is brought into contact with the contact portion 45A or 45B, thereby limiting shifting of the sensor lever 40 in a rotation axis direction S. The rotation axis direction S is a direction in which a rotation axis R of the sensor lever 40 extends, and the limiting portion 36 limits shifting of the sensor lever 40 in both directions (a first direction and a second direction) in the rotation axis direction S. The projection 41 is, for example, a claw-like member (locking claw) formed at the cover portion 43 and projects upward from the sensor lever 40. The shafts 42A and 42B are formed on the sides of the sensor lever 40 and project from the sensor lever 40 in the directions opposite from each other.

A shaft 42A is formed into a circular cylinder, and a shaft 42B is formed into a pillar. The shaft 42B has a shape in which part of an outer circumferential portion (here, the upper portion) is cut away from a circular cylinder having an identical radius as the shaft 42A (see FIG. 25). The cross section of the shaft 42B perpendicular to its rotation axis R has a shape in which part of an outer circumferential portion is cut away from a circle (see FIG. 20). Further, the shaft 42B has a shape in which part of an outer circumferential portion is cut away from a circular cylinder by about half the radius of the circular cylinder, the cutting leaving a chamfer 49 on the upper portion of the shaft 42B. The rotation axis of the shafts 42A and 42B is on the rotation axis R of the sensor lever 40, that is, is positioned on an identical line.

The bases 48 of the sensor lever 40 are disposed between the supports 34A and 34B of the sensor holder 30, and the shafts 42A and 42B of the sensor lever 40 project from the bases 48 toward the supports 34A and 34B. The shafts 42A and 42B are respectively disposed in the support holes 35A and 35B of the sensor holder 30, and the shafts 42A and 42B and the sensor lever 40 are supported by the supports 34A and 34B so as to be rotatable about the rotation axis R. The sensor lever 40 rotates in both directions about the rotation axis R and is displaced in the rotation direction.

The cover portion 43 of the sensor lever 40 is placed on the inertia mass 27 so as to cover the inertia mass 27, whereby the sensor lever 40 is disposed on the inertia mass 27. The rotation stopper 47 of the sensor lever 40 opposes to the limiting portion 36 of the sensor holder 30. When the sensor lever 40 rotates upward, the rotation stopper 47 is brought into contact with the limiting portion 36, thereby stopping the rotation of the sensor lever 40.

The cavity 44 of the sensor lever 40 is a disposition space where the limiting portion 36 of the sensor holder 30 is disposed. The cavity 44 is formed in a recessed manner between the shafts 42A and 42B. The limiting portion 36 is disposed between the shafts 42A and 42B in the cavity 44. The contact portions 45A and 45B of the sensor lever 40 define part of the cavity 44, and are located in two places respectively corresponding to the positions of the shafts 42A and 42B. Here, the contact portions 45A and 45B are inner surfaces of the cavity 44 and are perpendicular to the rotation axis R.

The tapered portions 46A and 46B of the sensor lever 40 are respectively formed on the lower side of the contact portions 45A and 45B at the cavity 44 (see FIG. 24). The tapered portions 46A and 46B are planes inclined relative to the rotation axis R, and are respectively inclined from the bottom ends of the contact portions 45A and 45B toward the externally extending direction of the rotation axis direction S (toward the shafts 42A and 42B). The bottom ends of the contact portions 45A and 45B are positioned below the rotation axis R with a slight distance from the rotation axis R. The bases 48 of the sensor lever 40 are respectively formed between the shafts 42A and 42B and the cavity 44, and are greater than the shafts 42A and 42B in the direction perpendicular to the rotation axis R.

Figure 26:
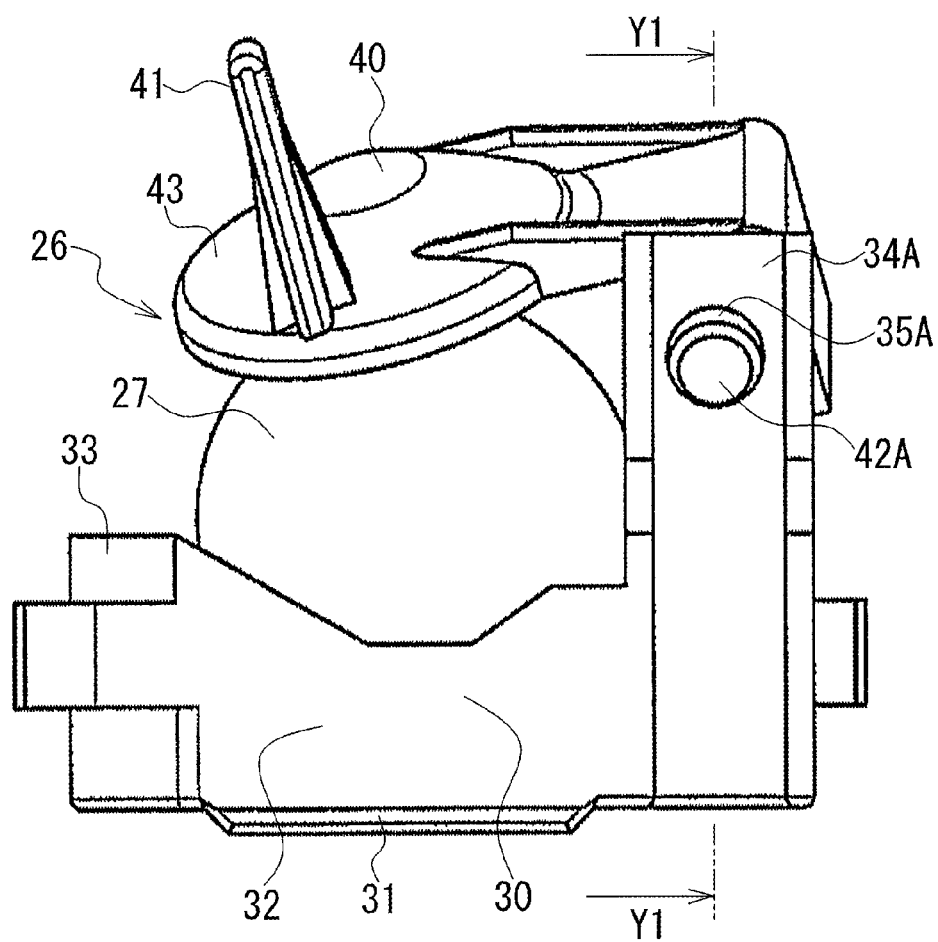
FIGS. 26 to 30 are diagrams showing an assembly procedure of the acceleration sensor.
Figure 27:
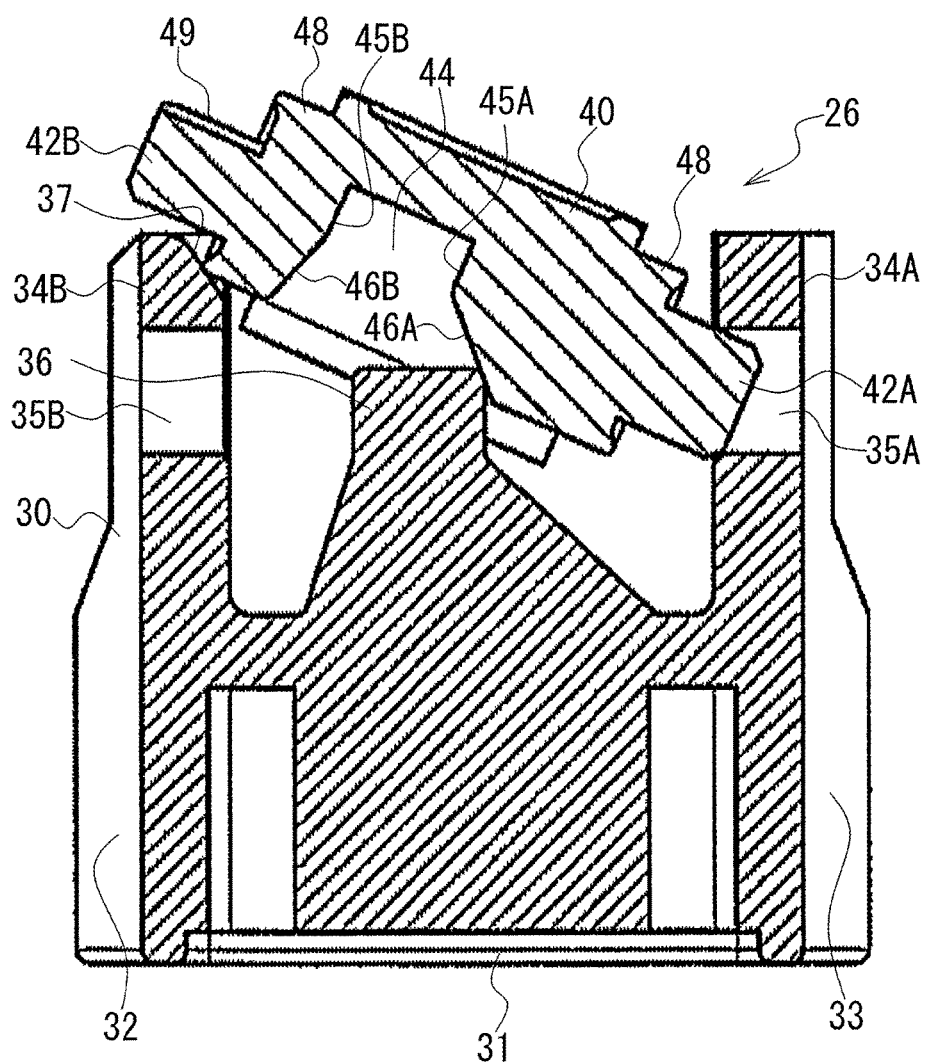
Figure 28:
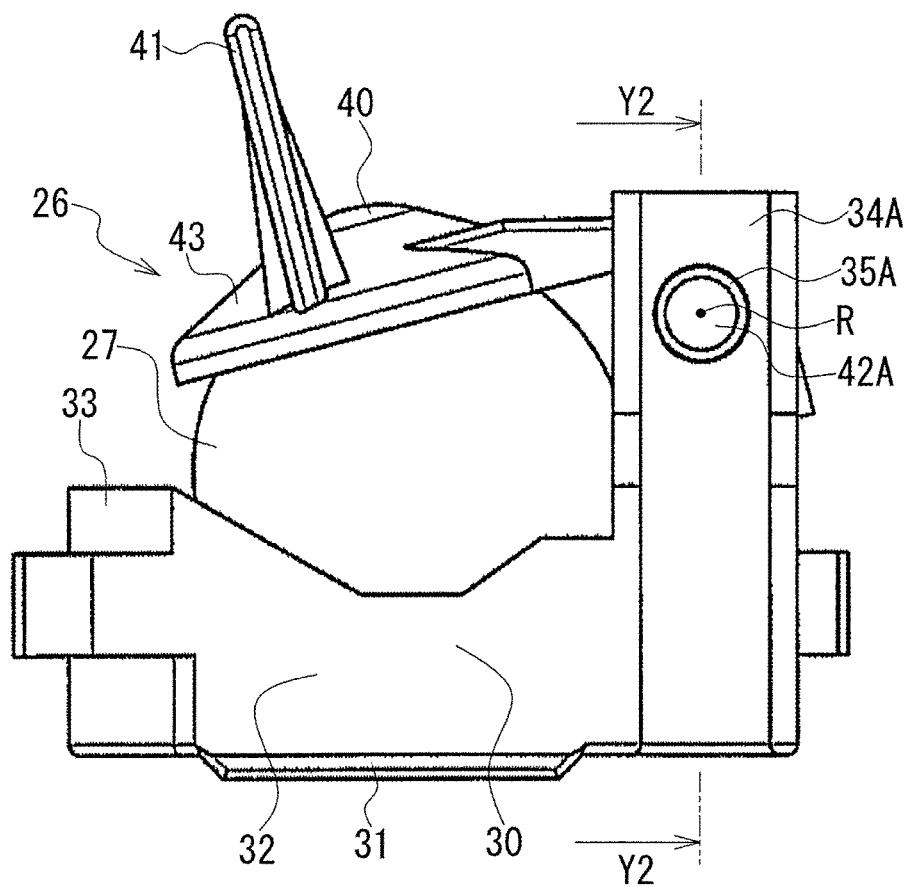
Figure 29:
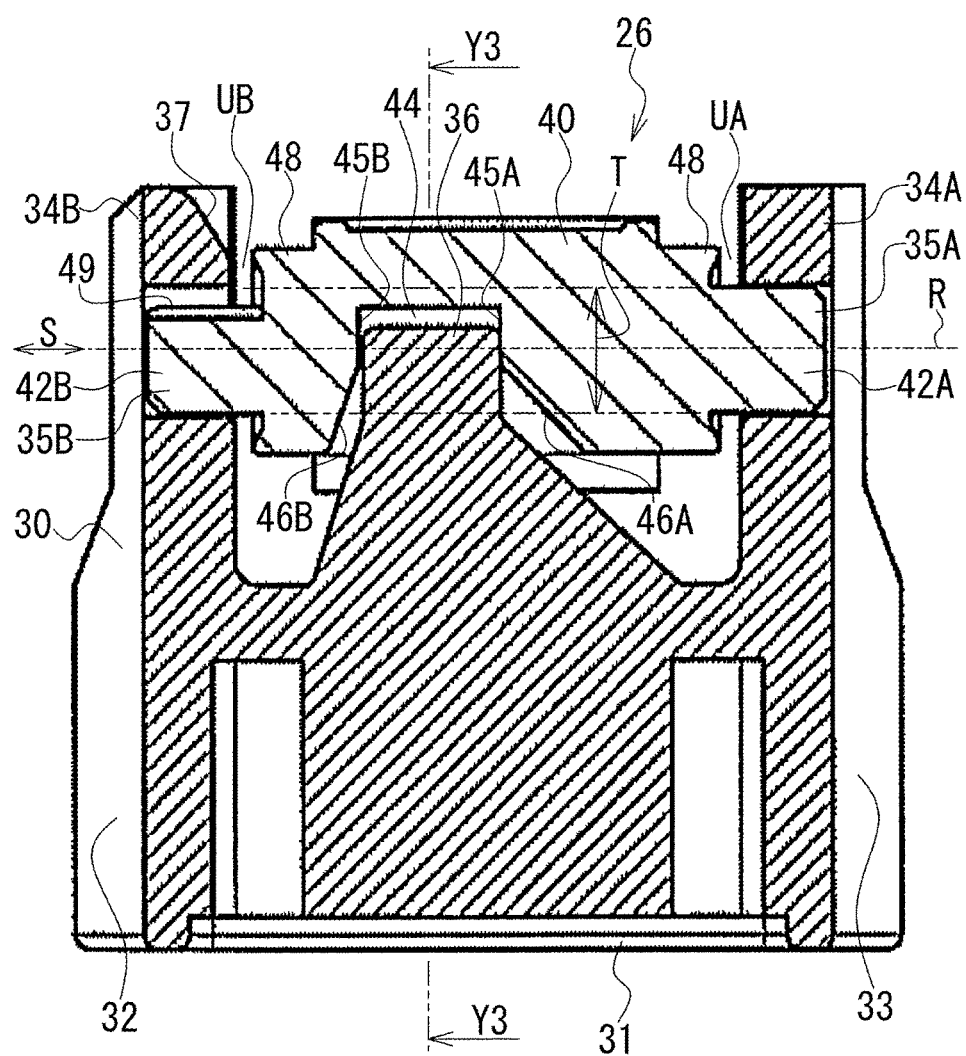
Figure 30:
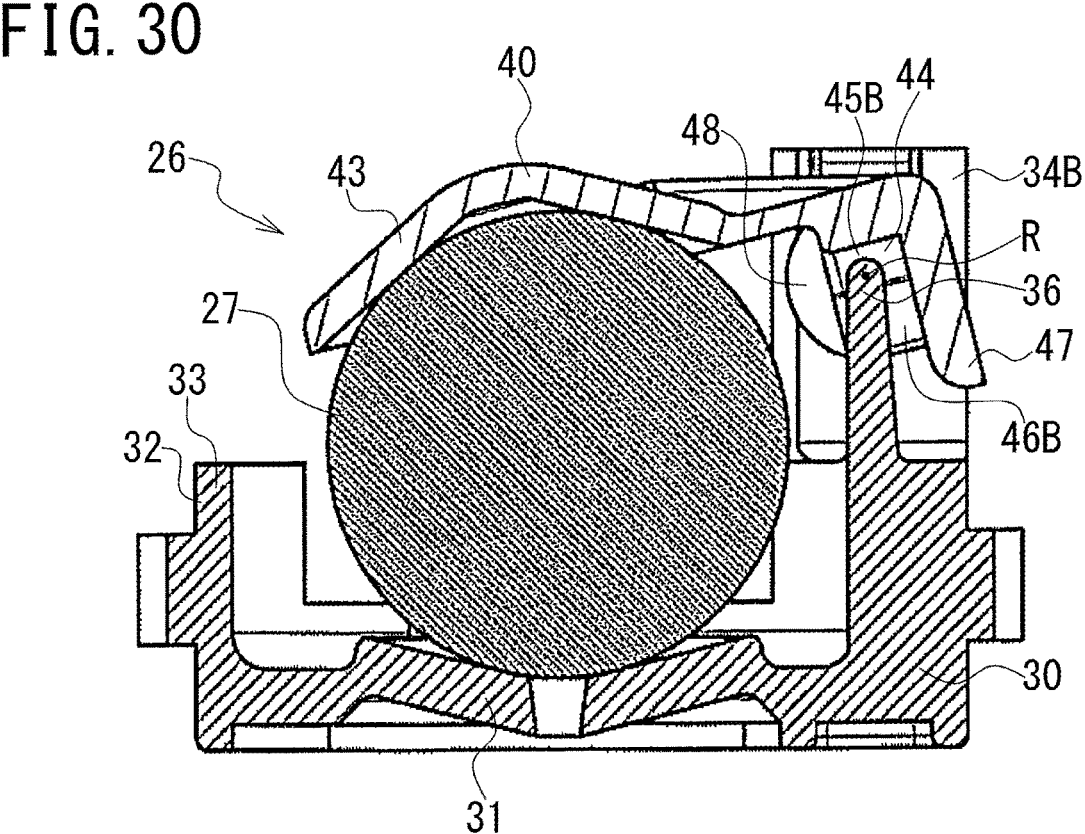

FIGS. 26 to 30 are diagrams showing the assembly procedure of the acceleration sensor 26. FIGS. 26 and 27 show the acceleration sensor 26 during assembly, and FIGS. 28 to 30 show the completely assembled acceleration sensor 26. Further, FIGS. 26 and 28 are each a side view of the acceleration sensor 26, and FIG. 28 shows the acceleration sensor 26 as seen from the opposite direction relative to FIG. 20. FIG. 27 is a cross-sectional view of the acceleration sensor 26 taken along line Y1-Y1 in FIG. 26. FIG. 29 is a cross-sectional view of the acceleration sensor 26 taken along line Y2-Y2 in FIG. 28. FIG. 30 is a cross-sectional view of the acceleration sensor 26 taken along line Y3-Y3 in FIG. 29.

As shown in the drawings, in assembling the acceleration sensor 26, firstly (see FIGS. 26 and 27), the inertia mass 27 is placed on the mounting portion 31 of the sensor holder 30. Further, the shaft 42A of the sensor lever 40 is inserted into a support hole 35A of the sensor holder 30, and the tip of the limiting portion 36 is brought into contact with a tapered portion 46A. Next, while the supports 34A and 34B are elastically deformed to widen the interval between them, the shaft 42B of the sensor lever 40 is pushed into a support hole 35B of the sensor holder 30 (see FIGS. 28 to 30).

The slope 37 of the sensor holder 30 is formed at the inner tip of the support 34B (on the limiting portion 36 side). The slope 37 is inclined relative to the projection direction of the support 34B. The shaft 42B is pushed into the support hole 35B from the tip of the support 34B along the slope 37. At this time, the slope 37 helps the widening of the interval between the supports 34A and 34B. Further, the chamfer 49 of the shaft 42B facilitates the entry of the shaft 42B into the support hole 35B, and the tapered portion 46A of the cavity 44 allows the limiting portion 36 to be smoothly inserted into the cavity 44. The shafts 42A and 42B of the sensor lever 40 are respectively inserted into the support holes 35A and 35B of the sensor holder 30, to be fitted into the support holes 35A and 35B.

The sensor lever 40 is placed on the inertia mass 27, and the shafts 42A and 42B are supported by the supports 34A and 34B of the sensor holder 30. Simultaneously, the limiting portion 36 of the sensor holder 30 is inserted into the cavity 44 of the sensor lever 40, to be disposed in the cavity 44. When an acceleration of a predetermined value or greater acts on the vehicle, the inertia mass 27 is displaced by an inertia force in the accommodating portion 33 while being held between the sensor holder 30 and the sensor lever 40. The displacement of the inertia mass 27 causes rotation and displacement of the sensor lever 40. Further, the displacement of the sensor lever 40 activates the locking mechanism 8 of the retractor 1.

Figure 31:
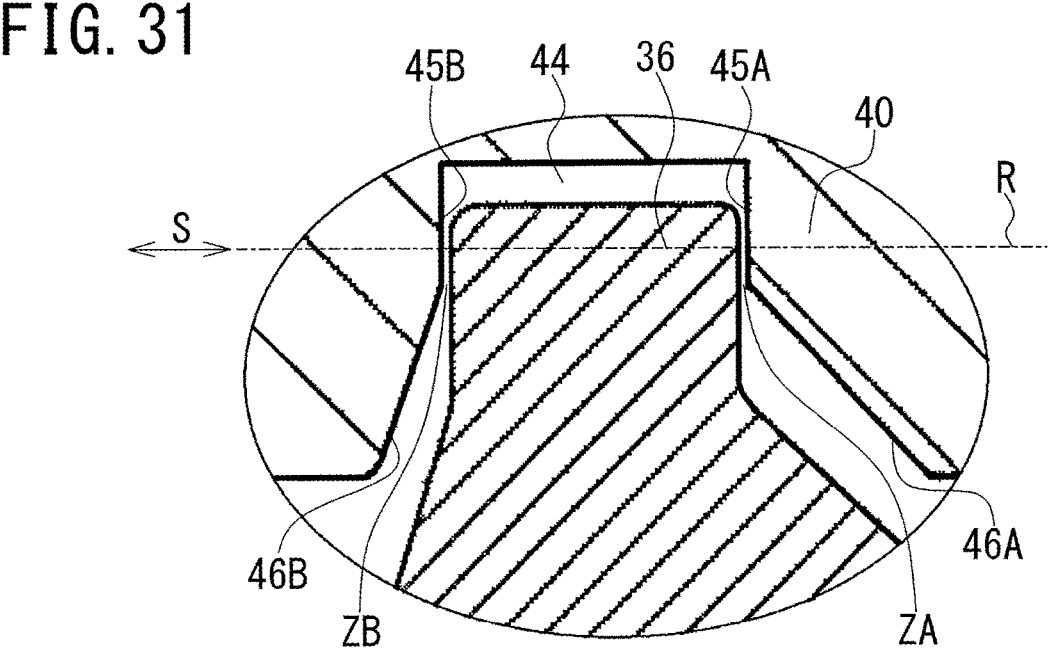
FIG. 31 is a cross-sectional view showing part of the acceleration sensor shown in FIG. 29 in an enlarged manner.

FIG. 31 is a cross-sectional view showing part of the acceleration sensor 26 shown in FIG. 29 in an enlarged manner, focusing on the limiting portion 36 and the cavity 44.

As shown in FIG. 29, the shafts 42A and 42B of the sensor lever 40 are supported by the supports 34A and 34B of the sensor holder 30. The supports 34A and 34B support the sensor lever 40 so as to be capable of rotating between the supports 34A and 34B and about the rotation axis R and shifting in the rotation axis direction S.

Specifically, in the rotation axis direction S, clearances UA and UB (see FIG. 29) are respectively formed between the supports 34A and 34B of the sensor holder 30 and the bases 48 of the sensor lever 40, and clearances ZA and ZB (see FIG. 31) are respectively formed between the contact portions 45A and 45B of the sensor lever 40 and the limiting portion 36 of the sensor holder 30. Of the clearances UA and UB, the clearance UA is formed between the support 34A and the base 48 opposing to the support 34A, and the clearance UB is formed between the support 34B and the base 48 opposing to the support 34B. Further, of the clearances ZA and ZB, the clearance ZA is formed between the contact portion 45A and the limiting portion 36 opposing to the contact portion 45A, and the clearance ZB is formed between the contact portion 45B and the limiting portion 36 opposing to the contact portion 45B.

The sensor lever 40 shifts in the rotation axis direction S between the supports 34A and 34B while changing the dimensions of the clearances UA, UB, ZA, and ZB. Further, the clearance UA is wider than the clearance ZB, and the clearance UB is wider than the clearance ZA. Therefore, shifting of the sensor lever 40 in the first or second direction in the rotation axis direction S eliminates the clearance ZA or the clearance ZB, bringing the contact portion 45A or the contact portion 45B into contact with the limiting portion 36 of the sensor holder 30. Shifting of the sensor lever 40 in the rotation axis direction S by the clearance ZA or the clearance ZB does not eliminate the clearances UA or UB, and the support 34A or 34B and the base 48 are not brought into contact with each other. The total dimension of the clearance ZA and the clearance ZB is designed based on ease of rotation of the sensor lever 40, and the minimum possible dimension that can be set is employed.

In this manner, shifting of the sensor lever 40 in the first or second direction in the rotation axis direction S brings one of the contact portions 45A and 45B of the sensor lever 40 into contact with the limiting portion 36 of the sensor holder 30, causing the sensor lever 40 to stop. Thus, the shifting of the sensor lever 40 in the rotation axis direction S stops. The limiting portion 36, which is in contact with the contact portion 45A or 45B, limits shifting of the sensor lever 40 in the first or second direction in the rotation axis direction S. In whichever direction, i.e., the first or second direction, in the rotation axis direction S the sensor lever 40 shifts, the shifting of the sensor lever 40 is limited by the limiting portion 36, and the base 48 is not brought into contact with the support 34A or 34B.

In the state where the shafts 42A and 42B of the sensor lever 40 are in contact with the inner surfaces of the support holes 35A and 35B formed at the supports 34A and 34B, the sensor lever 40 rotates. At this time, the clearances UA and UB are respectively formed between the supports 34A and 34B and the bases 48, and the supports 34A and 34B and the bases 48 are not brought into contact with each other. Further, in the state where the sensor lever 40 has shifted in the rotation axis direction S, the sensor lever 40 except for the contact portions 45A and 45B is constantly spaced apart from the limiting portion 36. The portions of the sensor lever 40 that may possibly be in contact with the limiting portion 36 are just the contact portions 45A and 45B.

Accordingly, during rotation of the sensor lever 40, friction between the sensor holder 30 and the sensor lever 40 occurs mainly due to contact between the shafts 42A and 42B and the supports 34A and 34B. When one of the contact portions 45A and 45B and the limiting portion 36 are in contact with each other, in addition to the friction due to contact between the shafts 42A and 42B and the supports 34A and 34B, the contact between one of the contact portions 45A and 45B and the limiting portion 36 only causes friction.

The limiting portion 36 of the sensor holder 30 is disposed in the cavity 44 of the sensor lever 40. In the cavity 44, the contact portions 45A and 45B of the sensor lever 40 are positioned on both sides in the rotation axis direction S of the sensor lever 40 relative to the limiting portion 36 and cross the rotation axis R of the sensor lever 40. Shifting of the sensor lever 40 in the rotation axis direction S brings one of the contact portions 45A and 45B into contact with the limiting portion 36. Further, the limiting portion 36 is disposed on the rotation axis R of the sensor lever 40 between the supports 34A and 34B of the sensor holder 30. The limiting portion 36 is brought into contact with the contact portion 45A or 45B around the rotation axis R, thereby limiting shifting of the sensor lever 40 in the rotation axis direction S.

The contact portions 45A and 45B of the sensor lever 40 are disposed between the supports 34A and 34B of the sensor holder 30 and are brought into contact with the limiting portion 36 of the sensor holder 30 in the area inside the cavity 44 positioned between the shafts 42A and 42B. Depending on the shifting direction (the first direction or the second direction) in the rotation axis direction S of the sensor lever 40, one of the contact portions 45A and 45B is brought into contact with the side of the limiting portion 36, thereby limiting the shifting of the sensor lever 40 in the rotation axis direction S. Further, the contact portions 45A and 45B are brought into contact with the portion of the limiting portion 36 including the rotation axis R. Shifting of the sensor lever 40 in the rotation axis direction S is limited only by the limiting portion 36 being in contact with the contact portion 45A or 45B.

Here, the limiting portion 36 of the sensor holder 30 is disposed inside the cavity 44 of the sensor lever 40 such that its tip is positioned higher than the rotation axis R. Further, the limiting portion 36 and the contact portion 45A or 45B are brought into contact with each other just in an area (a contact area T) closer to the rotation axis R than positions where the shafts 42A and 42B are in contact with the supports 34A and 34B, in the direction perpendicular to the rotation axis R, between the shafts 42A and 42B of the sensor lever 40 (see FIG. 29). Specifically, the contact area T between the shafts 42A and 42B (hereinafter simply referred to as the contact area T) is an area closer to the rotation axis R than the positions where the shafts 42A and 42B are in contact with the supports 34A and 34B in the support holes 35A and 35B. Further, the contact area T is also an area extending from the rotation axis R by the radius of the shafts 42A and 42B, and the limiting portion 36 and the contact portion 45A or 45B are brought into contact with each other only within the contact area T. The tip of the limiting portion 36 is positioned in the contact area T, and respective boundaries between the tapered portions 46A and 46B and the contact portions 45A and 45B are also positioned within the contact area T. Accordingly, the limiting portion 36 and the contact portion 45A or 45B are brought into contact with each other only in the contact area T.

During rotation of the sensor lever 40, between the supports 34A and 34B of the sensor holder 30, the sensor lever 40 except for the shafts 42A and 42B is not brought into contact with the supports 34A and 34B. Further, clearances are always formed between the supports 34A and 34B and the sensor lever 40 except for the shafts 42A and 42B. Here, the clearances UA and UB are respectively always formed between the supports 34A and 34B and the bases 48.

With the acceleration sensor 26 described above, the limiting portion 36 of the sensor holder 30 can limit shifting of the sensor lever 40 in the rotation axis direction S.

Accordingly, the minimized shifting of the sensor lever 40 in the rotation axis direction S enables precise positioning of the sensor lever 40.

During rotation of the sensor lever 40, friction between the sensor holder 30 and the sensor lever 40 occurs mainly due to contact between the shafts 42A and 42B of the sensor lever 40 and the supports 34A and 34B of the sensor holder 30. Further, when shifting of the sensor lever 40 in the rotation axis direction S brings the limiting portion 36 and the contact portion 45A or 45B into contact with each other, the contact between the limiting portion 36 and the contact portion 45A or 45B increases the friction between the sensor holder 30 and the sensor lever 40. At this time, the supports 34A and 34B are not in contact with the bases 48 of the sensor lever 40, and the sensor lever 40 except for the shafts 42A and 42B is not in contact with the supports 34A and 34B.

As the contact place (the place where friction occurs) between the sensor holder 30 and the sensor lever 40 approaches the rotation axis R, the rotation of the sensor lever 40 is less influenced by the friction. In connection with the influence of friction, with the acceleration sensor 26 according to the present embodiment, the supports 34A and 34B of the sensor holder 30 and the shafts 42A and 42B of the sensor lever 40 are in contact with each other just inside the support holes 35A and 35B. Thus, the reduced changes in friction between the sensor holder 30 and the sensor lever 40 reduces the influence of friction on the rotation of the sensor lever 40. Accordingly, the acceleration sensor 26 can stably operate and can surely detect an acceleration.

The contact portions 45A and 45B of the sensor lever 40 are provided in the cavity 44, and the limiting portion 36 of the sensor holder 30 is brought into contact with the contact portion 45A or 45B in the cavity 44. Therefore, the contact portions 45A and 45B can be easily formed at the sensor lever 40, and the limiting portion 36 can be surely brought into contact with the contact portion 45A or 45B. The limiting portion 36 is brought into contact with the contact portion 45A or 45B on the rotation axis R of the sensor lever 40. This reduces the influence of friction between the limiting portion 36 and the contact portion 45A or 45B on the rotation of the sensor lever 40.

The limiting portion 36 and the contact portion 45A or 45B are brought into contact with each other only in the contact area T. As a result, the limiting portion 36 and the contact portion 45A or 45B are brought into contact with each other at an area closer to the rotation axis R than the positions where the shafts 42A and 42B and the inner surfaces of the support holes 35A and 35B are in contact with each other. This further surely reduces the influence of friction on the rotation of the sensor lever 40.

Herein, the rotation axis R of the sensor lever 40 is horizontally disposed. On the other hand, the rotation axis R of the sensor lever 40 can be tilted from the horizontal direction. In this case also, the shifting of the sensor lever 40 in the rotation axis direction S can be limited, to enable precise positioning of the sensor lever 40. Further, the reduced influence of friction on the rotation of the sensor lever 40 allows the acceleration sensor 26 to stably operate.

The limiting portion 36 of the sensor holder 30 is disposed in the cavity 44 and is brought into contact with the contact portion 45A or 45B only inside the contact area T (the area closer to the rotation axis R). In this state, the tip of the limiting portion 36 may be at a position higher than the rotation axis R or at a position lower than the rotation axis R.

The shafts 42A and 42B of the sensor lever 40 may be different from each other in the radius. In this case, when the limiting portion 36 and the contact portion 45A or 45B are in contact with each other only in an area extending from the rotation axis R by the greater one of the radii of the shafts 42A and 42B also, the effect of reducing the influence of friction can be obtained. However, in order to further reduce the influence of friction, preferably, the limiting portion 36 and the contact portion 45A or 45B are brought into contact with each other only in an area extending from the rotation axis R by the smaller one of the radii of the shafts 42A and 42B.

The shafts 42A and 42B of the sensor lever 40 may each be formed into a shape other than a circular cylinder (for example, a prism). This mode also provides the effect of reducing the influence of friction by the limiting portion 36 and the contact portion 45A or 45B being brought into contact with each other only in the contact area T.

What is claimed is:

1. An acceleration sensor for a seat belt retractor, the acceleration sensor comprising:
   a sensor holder having a pair of supports;
   an inertia mass placed on the sensor holder and displaced by an inertia force; and
   a sensor lever having a base disposed between the pair of supports, and a pair of shafts projecting from the base and supported by the pair of supports, the sensor lever being supported between the pair of supports so as to be rotatable about a rotation axis and shiftable in a rotation axis direction, the sensor lever being disposed above the inertia mass and rotated and displaced by displacement of the inertia mass,
   wherein
   the sensor holder has a limiting portion coming into contact with the sensor lever so as to limit shifting of the sensor lever in a first direction and a second direction in the rotation axis direction,
   the sensor lever has a pair of contact portions coming into contact with the limiting portion when the sensor lever shifts in the first direction and the second direction, respectively, and
   the limiting portion limits the shifting of the sensor lever in any of the first direction and the second direction so as to avoid contact between the base and the pair of supports.

2. The acceleration sensor according to claim 1, wherein the sensor lever has a cavity positioned between the pair of shafts,
   the pair of contact portions are provided inside the cavity, and
   the limiting portion is disposed between the pair of supports and inside the cavity.

3. The acceleration sensor according to claim 2, wherein the pair of contact portions and the limiting portion are in contact with each other just in an area closer to the rotation axis of the sensor lever than a position where the pair of shafts are in contact with the pair of supports, in a direction perpendicular to the rotation axis of the sensor lever and between the pair of shafts of the sensor lever.

4. The acceleration sensor according to claim 3, wherein the limiting portion is disposed on the rotation axis of the sensor lever.

5. A seat belt retractor comprising the acceleration sensor according to claim 4.

6. A seat belt retractor comprising the acceleration sensor according to claim 3.

7. The acceleration sensor according to claim 2, wherein the limiting portion is disposed on the rotation axis of the sensor lever.

8. A seat belt retractor comprising the acceleration sensor according to claim 7.

9. A seat belt retractor comprising the acceleration sensor according to claim 2.

10. The acceleration sensor according to claim 1, wherein the pair of contact portions and the limiting portion are in contact with each other just in an area closer to the rotation axis of the sensor lever than a position where the pair of shafts are in contact with the pair of supports, in a direction perpendicular to the rotation axis of the sensor lever and between the pair of shafts of the sensor lever.

11. The acceleration sensor according to claim 10, wherein
the limiting portion is disposed on the rotation axis of the sensor lever.

12. A seat belt retractor comprising the acceleration sensor according to claim 11.

13. A seat belt retractor comprising the acceleration sensor according to claim 10.

14. The acceleration sensor according to claim 1, wherein the limiting portion is disposed on the rotation axis of the sensor lever.

15. A seat belt retractor comprising the acceleration sensor according to claim 14.

16. A seat belt retractor comprising the acceleration sensor according to claim 1.

* * * * *